(12) United States Patent
Shek et al.

(10) Patent No.: US 11,809,843 B2
(45) Date of Patent: Nov. 7, 2023

(54) ADAPTIVE USER INTERFACING

(71) Applicant: INTERNATIONAL BUSINESS MACHINES CORPORATION, Armonk, NY (US)

(72) Inventors: Elinna Shek, Ashburn, VA (US); Stanley John Vernier, Grove City, OH (US); Renee F. Decker, Brunswick, MD (US); Chengmin Ding, Chantilly, VA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/327,302

(22) Filed: May 21, 2021

(65) Prior Publication Data

US 2022/0374209 A1  Nov. 24, 2022

(51) Int. Cl.
  *G06F 9/44* (2018.01)
  *G06F 8/34* (2018.01)
  *H04L 51/02* (2022.01)
  *G06F 8/33* (2018.01)

(52) U.S. Cl.
  CPC ............... *G06F 8/34* (2013.01); *G06F 8/33* (2013.01); *H04L 51/02* (2013.01)

(58) Field of Classification Search
  CPC ............ G06F 8/33; G06F 8/34; H04L 51/02
  USPC ...................................... 717/106; 706/11–15
  See application file for complete search history.

(56) References Cited

U.S. PATENT DOCUMENTS 10,498,898 B2 * 12/2019 Mazza ................. G06F 16/3329
10,674,215 B2 *  6/2020 Sokolov ............... G06F 16/9535
10,747,823 B1 *  8/2020 Birnbaum .............. G06N 5/041
10,861,442 B2 * 12/2020 Manoharan ............ G10L 15/16
10,943,072 B1 *  3/2021 Jaganmohan .......... G06N 3/045
11,200,506 B2 * 12/2021 Wu ......................... G06F 40/30
(Continued)

OTHER PUBLICATIONS

Perez-Soler et al., "Model-Driven Chatbot Development", 2020, Springer Nature Switzerland, pp. 207-222. (Year: 2020).*

(Continued)

*Primary Examiner* — Ted T. Vo

(74) *Attorney, Agent, or Firm* — Nicholas Welling; George S. Blasiak; Heslin Rothenberg Farley & Mesiti P.C.

(57) ABSTRACT

Methods, computer program products, and systems are presented. The method computer program products, and systems can include, for instance: examining programming data defining a first user interactive user interfacing application for interactive engagement with an end user; examining programming data defining a second user interactive user interfacing application for interactive engagement with a user; identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and generating update data for updating the second user interactive user interfacing application in dependence on the one or more difference between the second user interactive user interfacing application and the first user interactive user interfacing application.

21 Claims, 9 Drawing Sheets

(56) References Cited

U.S. PATENT DOCUMENTS

| | | |
|---|---|---|
| 2019/0012390 A1 | 1/2019 | Nishant et al. |
| 2019/0272267 A1* | 9/2019 | Palmert ............... G06F 16/2358 |
| 2019/0327191 A1 | 10/2019 | Garcia et al. |
| 2020/0251111 A1* | 8/2020 | Temkin ................... G10L 15/22 |

OTHER PUBLICATIONS

Chitto et al., "Automatic Generation of Chatbots for Conversational Web Browsing", 2020, Springer Nature Switzerland, pp. 239-249. (Year: 2020).*

Bozic, et al., "Chatbot Testing Using AI Planning", 2019 IEEE International Conference on Artificial Intelligence Testing (AITest), 2019, pp. 37-44.

Shah, et al., "Building a Conversational Agent Overnight with Dialogue Self-Play", Google A1, Jan. 15, 2018, 11 pgs.

Huang, et al., "Evorus: a Crowd-powered Conversational Assistant Built to Automate Itself Over Time", Carnegie Mellon University, 2018, 13 pgs.

Anonymous, "A Method for Chat-Sot Response Visualization to the Wenpage", IP.com No. IPCOM000262508D, Jun. 8, 2020, 3 pgs.

Anonymous, "Natural Language Query Generation Equivalent to Click Through Navigation", IP.com No. IPCOM000259450D, Aug. 13, 2019, 5 pgs.

Mell, Peter, et al., "The NIST Definition of Cloud Computing", NIST Special Publication 800-145, Sep. 2011, Gaithersburg, MD, 7 pgs.

* cited by examiner

ADAPTIVE USER INTERFACING

BACKGROUND

Embodiments herein relate generally to user interfacing and particularly to adaptive user interfacing.

Data structures have been employed for improving operation of computer systems. A data structure refers to an organization of data in a computer environment for improved computer system operation. Data structure types include containers, lists, stacks, queues, tables, and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining programming data defining a first user interactive user interfacing application for interactive engagement with an end user; examining programming data defining a second user interactive user interfacing application for interactive engagement with a user; identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and generating update data for updating the second user interactive user interfacing application in dependence on the one or more difference between the second user interactive user interfacing application and the first user interactive user interfacing application.

In another aspect, a computer program product can be provided. The computer program product can include a computer readable storage medium readable by one or more processing circuit and storing instructions for execution by one or more processor for performing a method. The method can include, for example: examining programming data defining a first user interactive user interfacing application for interactive engagement with an end user; examining programming data defining a second user interactive user interfacing application for interactive engagement with a user; identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and generating update data for updating the second user interactive user interfacing application in dependence on the one or more difference between the second user interactive user interfacing application and the first user interactive user interfacing application.

In a further aspect, a system can be provided. The system can include, for example a memory. In addition, the system can include one or more processor in communication with the memory. Further, the system can include program instructions executable by the one or more processor via the memory to perform a method. The method can include, for example: examining programming data defining a first user interactive user interfacing application for interactive engagement with an end user; examining programming data defining a second user interactive user interfacing application for interactive engagement with a user; identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and generating update data for updating the second user interactive user interfacing application in dependence on the one or more difference between the second user interactive user interfacing application and the first user interactive user interfacing application.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
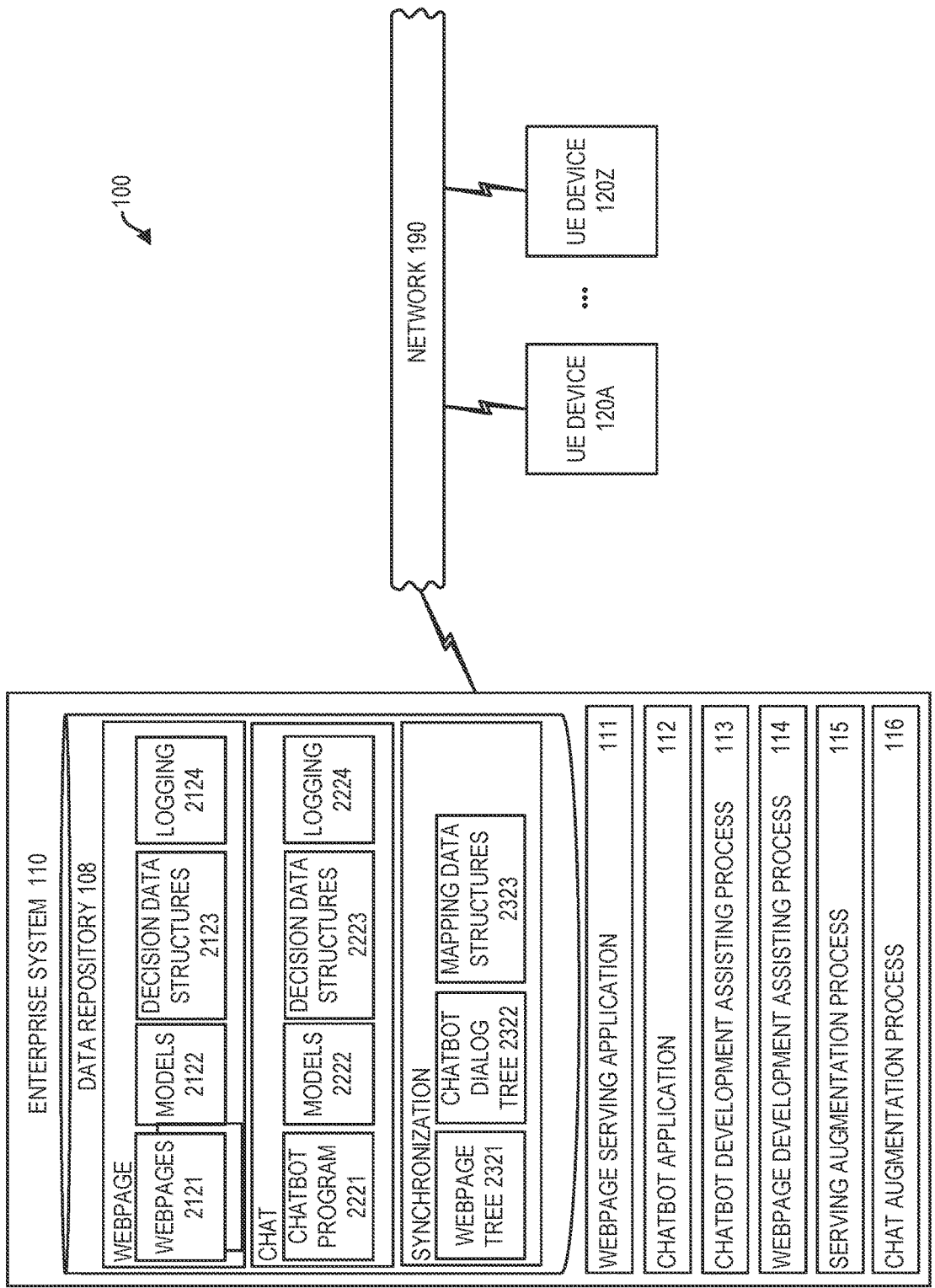
FIG. 1 depicts a system having an enterprise system and a plurality of user equipment (UE) devices according to one embodiment.

System 100, for use in providing interactive user interface content to a user, is shown in FIG. 1. System 100 can include enterprise system 110, and user equipment (UE) devices 120A-120Z. Enterprise system 110 and UE devices 120A-120Z can be in communication with one another via network 190. System 100 can include numerous devices which can be computing node-based devices connected by network 190. Network 190 can be a physical network and/or a virtual network. A physical network can include, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, enterprise system 110 can be external to UE devices 120A-120Z. In one embodiment, enterprise system 110 can be collocated with one or more of UE devices 120A-120Z.

Each of the different UA devices 120A-120Z can be associated to a different user. Users of the respective UE devices 120A-120Z can be, e.g., administrator users and/or end users. A UE device of UE devices 120A-120Z, in one embodiment, can be a computing node-based device provided by client computer device, e.g., a mobile device, e.g., smartphone or tablet, a laptop, smartwatch, or PC.

Embodiments herein recognize that a webpage serving application associated to an enterprise and a chatbot application associated to the enterprise can advantageously have common attributes. Embodiments herein recognize that a chatbot application associated to an enterprise can be advantageously configured to include attributes of the webpage serving application associated to the enterprise, and conversely that a webpage serving application associated to an enterprise can be advantageously configured to include attributes of a chatbot application associated to the enterprise. Embodiments herein can include features to examine programming data defining a webpage serving application and using the result of the examining to configure programming data defining the website's chatbot application. Embodiments herein can also include examining programming data defining a chatbot application and using the result of the examining to configure programming data defining a website's webpage serving application.

Enterprise system 110 can include data repository 108 storing various data. Data repository 108 can store various webpage data that supports the serving of webpages. In webpages area 2121, data repository 108 can store a set of webpages. The set of webpages can be encoded with use of text based markup language programming data, e.g., the hypertext markup language (HTML). Text based markup language programming data can define hierarchical data organization in which various webpages are linked together according to an established hierarchy, e.g., including a homepage and various landing pages tiered under the homepage. The webpage programming data can define a hierarchical data organization, e.g., where there is provided a homepage and landing pages of differentiated subject matter tiered below the homepage. Additional subjects can be tiered below the subject landing pages and can have respective landing pages. The text based markup language programming data can define actions that can be selected by a user, e.g., clicks, for navigating between webpages.

In models area 2122, data repository 108 can store various predictive models, e.g., trained predictive models trained by machine learning that can be useful in optimizing the serving of webpages to a user. Data repository 108 can include decision data structures area 2123 which can include various decision data structures and return of action decisions in respect to serving webpages to a user.

Data repository 108 can include in logging area 2124 logging data that can specify attributes of each webpage serving and browsing session of respective users of a website. The logging data of logging area 2124 can log each webpage serving session served by enterprise system 110 according to user and times. Session logging data can specify, e.g., the set of webpages visited by a user during a session, a set of actions taken by a user during a session, and the input data by a user during a session. The logging data can store the order of webpages visited and actions taken by a user to navigate between webpages.

Data repository 108 can store various chat data. Data repository 108 in chatbot program area 2221 can store chatbot programming data defining a chatbot application associated to a website for providing a chatbot application. Chatbot programs can be provided in various programming languages including, e.g., Python, Java, Lisp, PHP, and Ruby. The programming data defining the chatbot program can define a hierarchical data organization, e.g., in which response prompting data subjects can be presented to a user according to an established hierarchy, e.g., a certain classification of prompting data presented in response to a certain derived intent.

Data organization of a chatbot can feature e.g., an opening condition conversation stage (often mapping to a main greeting message) prompting data response subject and various prompting data response subjects tiered under the opening condition.

In models area 2222, data repository 108 can store predictive models for use in optimizing chat responses to a user in a chatbot session. Predictive models in models area 2222 for support of a chatbot application can include, e.g., predictive acoustic models and predictive language models. Data repository 108 in decision data structures area 2223 can store various decision data structures, e.g., decision tables and decision trees for use in producing action decisions in respect to producing chatbot responses to a user.

Data repository 108 in logging area 2224 can store chatbot session logging data. Chatbot session logging data of logging area 2224 can be stored according to user and session time. The chatbot session data can store text based data for each session indicating the entirety of conversation between chatbot and user during a chatbot session. The chatbot logging data can include data specifying a user of a session and times of the session. The chatbot logging data can include labels indicating a conversation stage associated to each respective instance of chatbot prompting data and user response data. The conversation stage can be specified based on the hierarchical data organization of chatbot session, e.g., chatbot subjects mapping to intents arranged under an opening condition.

Data repository 108 can store various synchronization mapping data. Synchronization mapping data of data repository 108 can be used by enterprise system 110 for optimizing performance of a chatbot application and/or a webpage serving application.

Data repository 108 in webpage tree area 2321 can store a webpage action state tree data structure that specifies the hierarchical data organization of a set of servable webpages available on an enterprise website. The webpage action state tree data structure can specify an overall data organization of a webpage serving application in which there is a root node mapping to a homepage, and one or more first order nodes linked to the root node mapping to first order landing pages, and in some cases, second to Nth order nodes mapping, respectively, to second to Nth order landing pages. The webpage action state tree data structure stored in webpage tree area 2321 can include text based data associated to various nodes of the webpage action state tree data structure. Enterprise system 110 can be configured to examine webpage programming data for providing a webpage action state tree data structure.

A webpage action state tree data structure can specify states and actions of a webpage serving application. The nodes of the action state tree data structure representing states can specify webpages, e.g., homepages and landing pages having associated text based content. The edges of the action state tree data structure can specify link activations for navigating between the various webpages.

Data repository 108 in chatbot dialog tree area 2322 can store a chatbot dialog action state tree data structure that specifies the hierarchical data organization for a chatbot application running on an enterprise website. The chatbot dialog action state tree data structure can specify a root node mapping to an opening condition and main greeting response of the chatbot and one or more first order node mapping to different intent subjects. The chatbot dialog action state tree data structure stored in chatbot dialog tree area 2322 can be provided by examining programming data defining a chatbot application of an enterprise website.

A chatbot action state tree data structure can specify states and actions of a chatbot application. The nodes of the action state tree data structure representing states can specify chatbot conversation stages having associated text based content. The edges of the action state tree data structure representing actions can specify recognizable and derivable intents for navigating between the various conversation stages.

Data repository 108 in mapping data structures area 2323 can store one or more mapping data structures that maps attributes of a data organization of webpage service application defined by a set of linked webpages to a data organization of a chatbot application.

Enterprise system 110 can be configured to run various processes. Enterprise system 110 can run webpage serving application 111 defining a webpage serving process. Webpage serving application 111 provides the functionality wherein enterprise system 110, in response to actions of a user, serves webpages to a user engaged in a browsing session in an organized way in dependence on browsing actions of a user, e.g., user clicks for activation of webpage links. The running of webpage serving application 111 can be supported by the various webpage data described with reference to webpages area 2121, models area 2122, decision data structures area 2123, and logging area 2124.

Enterprise system 110 can run chatbot application 112 defining a chatbot process. Enterprise system 110 running chatbot application 112 provides the functionality wherein enterprise system 110 can provide prompting data which prompts a user to provide various reply data. In response to reply data of the user, a chatbot application can recognize an intent and provide subsequent prompting data to the user.

Chatbot application 112 can be supported by chat data stored in data repository 108 including the described chat data of chatbot program area 2221, models area 2222, decision data structures area 2223, and logging area 2224. Running of chatbot application 112 can be supported by chat data, e.g., the described chat data described in reference to FIG. 1.

In another aspect, enterprise system 110 can run chatbot development assisting (DA) process 113. Enterprise system 110 running chatbot DA process 113 can include enterprise system 110 examining programming data of webpages area 2121 to return webpage action state tree data structure A10 for webpages served by webpage serving application 111. Enterprise system 110 running chatbot DA process 113 can include enterprise system 110 parsing text based markup language programming data to identify programming data features indicating the creation, e.g., of a homepage, landing pages, webpage links, and text based content associated to various webpages. Enterprise system 110 running chatbot DA process 113 can include enterprise system 110 examining program data defining webpages stored in webpages area 2121 for return of a webpage action state tree data structure that specifies the data organization of a website's webpages. For performing examining of program data defining the webpage, enterprise system 110 can identify, e.g., a homepage, links to landing pages, including links to landing pages within a homepage, and links to lower tiered landing pages within landing pages.

Webpage action state tree data structure A10 can specify states and actions of a webpage serving application. The nodes of the action state tree data structure representing states can specify webpages, e.g., homepages and landing pages having associated text based content. The edges of the action state tree data structure A10 representing actions can specify link activations for navigating between the various webpages. For populating webpage associated nodes of webpage action state tree data structure A10, enterprise system 110 can identify webpages defined in webpage serving application programming data. For populating link activation associated edges of webpage action state tree data structure A10, enterprise system 110 can identify link activation buttons defined in webpage serving application programming data.

Figure 2A:
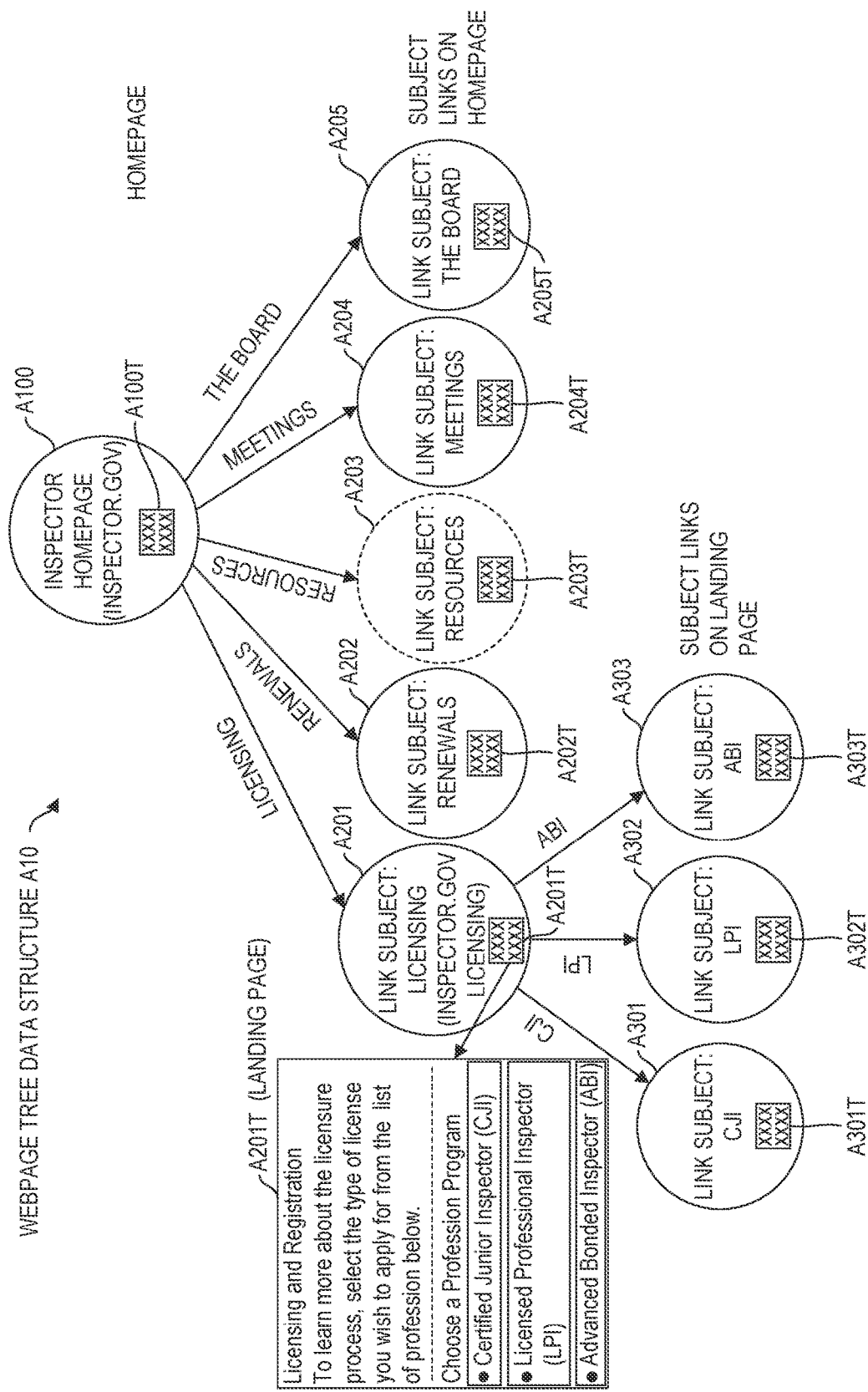
FIG. 2A depicts a webpage action state tree data structure to one embodiment.

FIG. 2A illustrates a webpage action state tree data structure A10 that can be provided by running of chatbot DA process 113 by examining programming data defining a set of webpages. The webpage action state tree data structure of FIG. 2A can include root node A100, which specifies a homepage and a plurality of first order nodes A201, A202, A203, A204 and A205, which specify respective landing pages linked to the homepage by respective homepage links. The landing pages can have respective labels mapping to different subjects.

In FIG. 2A, illustrative data of an "inspector" website is shown. Accessible landing pages linked by link activations to a homepage can include, e.g., a "licensing" linked landing page, a "renewals" linked landing page, a "resources" linked landing page, a "meetings" linked landing page, and a "Board" linked landing page. Webpage action state tree data structure A10 of FIG. 2A can have second order nodes, which can specify landing pages linked to and accessible within respective homepage linked landing pages.

Enterprise system 110 examining a program data defining set of webpages to provide webpage action state tree data structure A10 can include enterprise system 110 identifying programming data features creating webpage links, e.g., link activation buttons, that provide for navigation between a homepage and a landing page or between landing pages. Identified webpage links specify actions that facilitate navigation between webpages. In FIG. 2A, enterprise system 110 can label a respective edge between webpage associated nodes with a label associated to a child node landing page connected by the edge and a link activation button for navigating to the child node landing page.

Enterprise system 110 examining a program data defining set of webpages to provide webpage action state tree data structure A10 can include enterprise system 110 extracting text based content associated with various webpages, including the homepage and landing page. Referring to FIG. 2A, the homepage can include text based content A100T and the various landing pages can also have text based content A201T, A202T, A203T, A204T, A205T.

Enterprise system 110 running webpage DA process 114 can also comprise enterprise system 110 examining programming data defining a chatbot application to identify programming data features indicating the creation of a chatbot opening condition having associated response prompting data and conversation stage nodes having associated prompting data, as well as intents that are associated to different sets of prompting data.

Enterprise system 110 running webpage DA process 114 can comprise enterprise system 110 examining programming data defining chatbot application 112, i.e., one or more chatbot programs stored in chatbot program area 2221. Enterprise system 110 running webpage DA process 114 can examine chatbot application programming data to identify, e.g., features creating conversation stages having sets of response prompting data for presentment by a chatbot, candidate intents associated to conversation stages, and lower tiered conversation stages having prompting data and being accessible by recognition of an intent.

Embodiments herein recognize that a chatbot application can feature a hierarchical data organization. Running of chatbot application 112 can include presenting a user opening condition response prompting data at an opening conversation stage, which opening condition prompting data can have candidate intents detected for in response to presentment of the conversation stage prompting data, the different candidate intents having respective different sets of conversation stages and associated sets of next prompting data. Running of chatbot application 112 can include subjecting reply data of a user to determine which of the candidate intents have been invoked by a user. When a certain candidate intent has been invoked, conversation stage response prompting data associated with that certain candidate intent can be presented. The intent related sets of conversation stage prompting data can themselves have associated lower tiered candidate intents, associated lower tiered conversation stages, and sets of prompting data leading to the characteristic hierarchical data organization.

Enterprise system 110 can examine chatbot application programming data to provide chat dialog tree data structure B10 as explained with reference to FIG. 2B. A chatbot dialog action state tree data structure for a chatbot application can include root node B100 that specifies an opening condition conversation stage, i.e., welcome prompting data for presentment by a chatbot defining an opening condition conversation stage response of a chatbot. The opening condition can be related to a plurality of lower tiered conversation stages expressed as lower tiered first order nodes B201-B205 connected by respective edges specifying candidate intents detected for in response to the presentment of the opening condition prompting data. In various responses in a chatbot session, a virtual agent (VA) can present conversation stage prompting data in the form of chatbot responses.

Chatbot action state tree data structure B10 can specify states and actions of chatbot application 112. The nodes of action state tree data structure B10 representing states can specify chatbot conversation stages having associated text based content. The edges of the action state tree data structure B10 representing actions can specify recognizable and derivable intents for navigating between the various conversation stages. For populating conversation stages associated to nodes of chatbot dialog action state tree data structure A10, enterprise system 110 can identify conversation stages defined in chatbot application programming data.

For populating intent associated edges of chatbot dialog action state tree data structure B10, enterprise system 110 can identify intents defined in chatbot application programming data.

Chatbot application 112 can be configured to process user replies to chatbot prompting data responses. In processing user replies, chatbot application 112 can identify user intent from a set of candidate intents. To any presented chatbot response prompting data presented for a conversation stage, a chatbot application can determine whether a user has invoked an intent from a set of defined candidate intents.

Figure 2B:
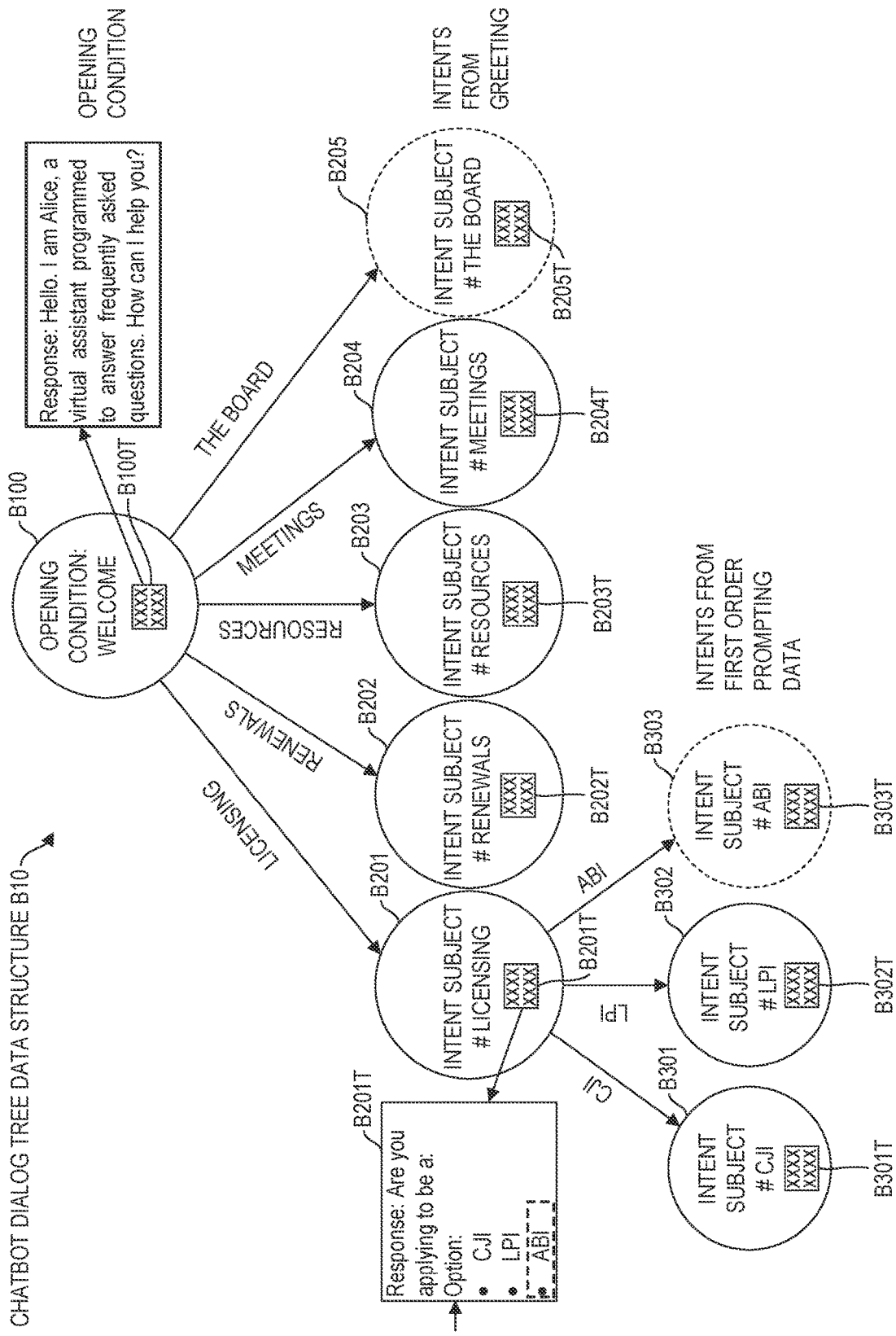
FIG. 2B depicts a webpage action state tree data structure according to one embodiment.

In FIG. 2B, illustrative data of an "inspector" licensing chatbot application is shown. Candidate intents detected in response to presentment of opening condition conversation stage prompting data associated to root node B100 can include, e.g., a "licensing" intent, a "renewals" intent, a "resources" intent, a "meetings" intent" and a "Board" intent. Differentiated conversation stages associated to the different first order nodes B201-B205 can be activated in response to recognition of respective ones of the candidate intents. If a user presents reply data that cannot be resolved as relating to one of the intents, the chatbot might reply by stating that the chatbot does not understand the reply.

Enterprise system 110 examining program data defining a chatbot application to provide chatbot dialog action state tree data structure B10 can include enterprise system 110 extracting text based content associated to conversation stage chatbot response prompting data. Referring to FIG. 2B, the opening condition can include text based content B100T, and the various first order conversation stage nodes B201-B205 tiered under root node B100 can include respective sets of text based content, B201T-B205T defined by conversation stage prompting data. Enterprise system 110 running chatbot DA process 113 to provide chatbot dialog action tree data structure B10 can include enterprise system 110 extracting text based content associated to the nodes depicted in the inspector chatbot dialog action state tree data structure of FIG. 2B. The various nodes of FIG. 2B below the opening condition node can specify candidate conversation stages tiered under the root node invoked by intents, and each conversation stage node associated to an intent can have an associated text based content. For example, node B201, specifying the conversation stage subject "licensing" can have the text based content B201T, which is shown in the expanded view area of FIG. 2B. The specified text based content areas B201T-B205T and B301T-B303T shown in FIG. 2B refer to conversation stage prompting data presented by a chatbot when a certain intent is identified. Referring to FIG. 2A and FIG. 2B, various webpage nodes of webpage action state tree data structure A10 can have text based content which can be provided by the text based content of the homepage specified by root node A100 or a landing page, specified by first order nodes A201-A205 or second order nodes A301-A303.

Enterprise system 110 running webpage DA process 114 can include enterprise system 110 running processes in common with or similar to the processes described with reference to chatbot DA process 113. Enterprise system 110 running webpage DA process 114 can examine programming data defining a chatbot application and programming data defining a set of webpages to provide a webpage action state tree data structure and a chatbot action state tree data structure and can include extracting text based data from programming data defining webpages and programming data defining conversation stages to populate the webpage action state tree data structure and a chatbot action state tree data structure.

Embodiments herein recognize that chatbot application 112 can be enhanced based on attributes including text based data attributes of a set of webpages and that webpage serving application 111 can be enhanced based on attributes of chatbot application 112. Embodiments herein recognize, for example, that it can be advantageous to configure a chatbot application to have a hierarchical data organization based on a hierarchical tree data organization of a set of webpages as specified in a webpage action state tree data structure. Embodiments herein recognize, for example, that it can be advantageous to configure a webpage serving application to have a hierarchical data organization based on a hierarchical tree data organization of a chatbot application as specified in a chatbot dialog action state tree data structure. In one aspect, embodiments herein recognize that a chatbot application can be advantageously configured to include intents having associated subjects that map to links of a webpage serving application. In one aspect, embodiments herein recognize that a webpage serving application can be advantageously configured to include links having associated subjects that map to intents of a chatbot application. In one aspect, embodiments herein recognize that a chatbot application can be advantageously configured to include intents having associated subjects that map to links specified within a webpage action state tree data structure. In one aspect, embodiments herein recognize that a webpage serving application can be advantageously configured to include links having associated subjects that map to intents specified within a chatbot dialog action state tree data structure.

Embodiments herein recognize that a chatbot application can be advantageously configured so that a chatbot dialog action state tree data structure associated to a chatbot application has conversation stage nodes mapping to webpage nodes of a webpage action state tree data structure characterizing a webpage serving application. Embodiments herein also recognize that a webpage serving application can be advantageously configured so that a webpage action state tree data structure associated to a webpage serving application has a set of webpage nodes that map to conversation stage nodes of a chatbot tree data structure characterizing a chatbot application.

Enterprise system 110 running chatbot DA process 113 can include enterprise system 110 identifying differences between a chatbot tree data structure and a webpage action state tree data structure, e.g., missing nodes, and enterprise system 110 generating update data in response to the identifying of differences. The update data can include one or more of prompting data for prompting a developer user to make changes to programming data and/or can include program code data for extending a current functionality of chatbot application 112. Enterprise system 110 running webpage DA process 114 can include enterprise system 110 identifying differences between a chatbot tree data structure and a webpage action state tree data structure, e.g., missing nodes, and enterprise system 110 generating update data in response to the identifying of differences. The update data can include one or more of prompting data for prompting a developer user to make changes to programming data and/or can include program code data for extending a current functionality of webpage serving application 111. Update data generated by chatbot DA process 113 and/or webpage DA process 114 can include update data, e.g., to add an intent in the case of chatbot DA process 113 or add a link in the case of webpage DA process 114. Update data generated by chatbot DA process 113, and/or webpage DA process 114 can include update data, e.g., to add a conversation stage in the case of chatbot DA process 113 or add a webpage in the case of webpage DA process 114.

By use of mapping data herein, update data to add an intent to a chatbot application can specify a hierarchical order location for the intent based on a hierarchical ordering of an associated webpage link activation button in a set of linked webpages. By use of mapping data herein, update data to add a conversation stage to a chatbot application can specify a hierarchical order location for the conversation stage based on a hierarchical ordering of an associated webpage in a set of linked webpages. By use of mapping data herein, update data to add a webpage link activation button to a webpage serving application can specify a hierarchical order location for the webpage link activation button based on a hierarchical ordering of an associated intent in a chatbot application. By use of mapping data herein, update data to add a webpage to a webpage serving application can specify a hierarchical order location for the webpage based on a hierarchical ordering of an associated conversation stage in a chatbot application. Update data can also include update data to provide text based content for a second user interactive user interfacing application based on text based content of a first user interactive user interfacing application. Embodiments herein can facilitate rapid updates, including initial deployment, of a chatbot application. Embodiments herein can facilitate rapid updates, including initial deployment, of a webpage serving application.

Enterprise system 110 running serving augmentation process 115 can include enterprise system 110 augmenting a webpage serving session and corresponding browsing session of a user in dependence on chatbot data. As explained with reference to FIGS. 2A and 2B, embodiments herein recognize that a set of webpages and a chatbot application can have mapping action state tree data structure nodes. Namely, a chatbot application can have conversation stage nodes mapping to commonly labeled webpage nodes of a web-serving application, and similarly, a webpage-serving application can be advantageously configured to have webpage nodes that map to commonly labeled conversation stage nodes of a chat tree data structure. As explained with reference to FIGS. 2A and 2B, embodiments herein recognize that a set of webpages and a chatbot application can have mapping tree data structure edges. Namely, a chatbot application can have intent edges mapping to commonly labeled webpage link edges of a webpage serving application, and similarly, a webpage serving application can be advantageously configured to have webpage link edges that map to commonly labeled intents of a chat dialog tree data structure.

Enterprise system 110 running serving augmentation process 115, can operate as a plug-in to webpage serving application 111, and can augment presentment of webpage data to a user in dependence on mapping between nodes, edges of a webpage action state tree data structure, and a chatbot dialog action state tree data structure.

Similarly, enterprise system 110 running chat augmentation process 116 can include enterprise system 110 augmenting a chatbot session in dependence on mapping data that maps attributes of a chatbot application to attributes of a webpage serving application.

Enterprise system 110 can perform natural language processing (NLP) for extraction of NLP output parameter values from webpage data and/or chatbot user conversation data. Enterprise system 110 can include enterprise system 110 performing one or more of a topic classification process that determines topics of messages and outputs one or more topic NLP output parameter value, a sentiment analysis process which determines sentiment parameter value for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameter values, e.g., one of more "social tendency" NLP output parameter or one or more "writing style" NLP output parameter, and/or one or more part of speech NLP output parameter value. Part-of-speech tagging methodologies can include use of, e.g., Constraint Grammar, Brill tagger, Baum-Welch algorithm (the forward-backward algorithm) and the Viterbi algorithm which can employ use of the hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

Enterprise system 110 performing natural language processing can include enterprise system 110 performing (a) topic classification and output of one or more topic NLP output parameter for a received message, (b) sentiment classification and output of one or more sentiment NLP output parameter value for a received message, or (c) other NLP classifications and output of one or more other NLP output parameter for the received message. Topic analysis for topic classification and output of NLP output parameter values can include topic segmentation to identify several topics within a message. Topic analysis can apply a variety of technologies, e.g., one or more of hidden Markov model (HMM), artificial chains, passage similarities using word co-occurrence, topic modeling, or clustering. Sentiment analysis for sentiment classification and output of one or more sentiment NLP parameter value can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond the polarity of a given text. Advanced sentiment classification can classify emotional states as sentiment classifications. Sentiment classifications can include the classification of "anger," "disgust," "fear," "joy," and "sadness."

Figure 3:
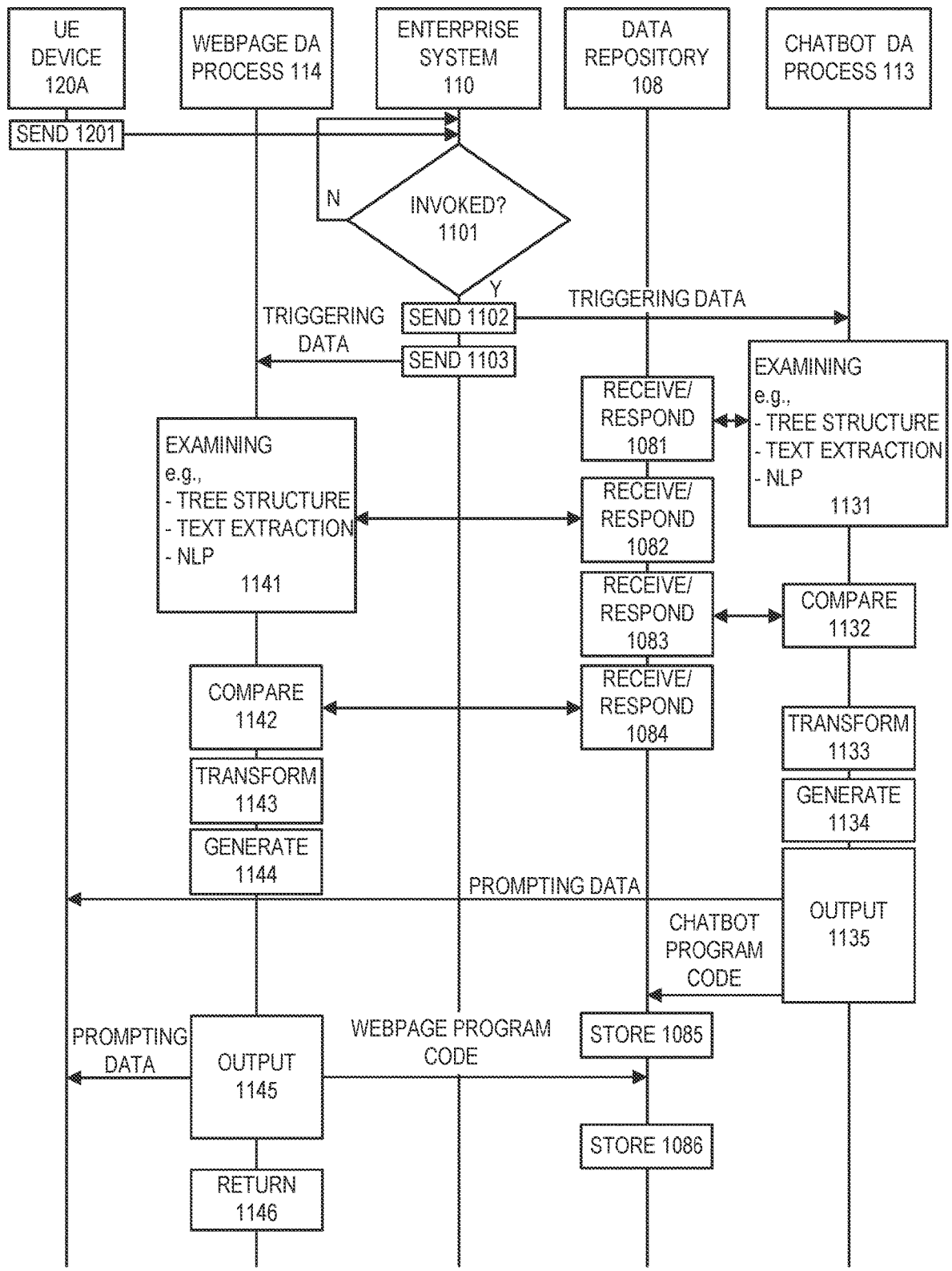
FIG. 3 is a flowchart illustrating a method for performance by an enterprise system interoperating with a UE device according to one embodiment.

Further details of embodiments herein are described with reference to the flowchart of FIG. 3 illustrating a method for performance by enterprise system 110 running chatbot DA process 113 and webpage DA process 114 interoperating with a UE device of UE devices 120A-120Z. At block 1201, UE device 120A by actions of its user can be sending user defined data for receipt by enterprise system 110. In response to the received user defined data, enterprise system 110 at block 1101 can determine whether one or more of chatbot DA process 113 or webpage DA process 114 has been invoked.

Enterprise system 110 can be configured so that various actions of a user, e.g., a developer user or an end user can invoke running of one or more of chatbot DA process 113 and/or webpage DA process 114. For example, the user may be a developer user and the developer user may open a program editor associated with chatbot DA process 113 to invoke chatbot DA process 113. A developer user can open an editor associated with webpage DA process 114 to invoke webpage DA process 114.

In another example, enterprise system 110 can be configured so that user defined data defined by an end user can invoke one or more of chatbot DA process 113 and/or webpage DA process 114. For example, enterprise system 110 can be configured so that a webpage of a webpage application including webpage serving application 111 includes a field permitting an end user to input text based data. Enterprise system 110 can be configured to subject the user input text based data to natural language processing to extract topic and sentiment of the text based user input data. On the condition that a topic has been extracted indicating that a user would like to communicate with a chatbot and/or on the condition that the sentiment of the user has fallen below a low threshold indicating a strongly negative sentiment, enterprise system 110 can invoke chatbot DA process 113.

In another example, enterprise system 110 can subject text based user defined user input data to natural language processing to extract topics and on the condition that a topic has been extracted indicating that the user is frustrated with the current operation of webpage serving application 111, enterprise system 110 can invoke webpage DA process 114 to update webpage serving application 111.

In another example, enterprise system 110 at block 1101 can determine whether one or more of chatbot DA process or webpage DA process has been invoked independent of user input data. For example, enterprise system 110 can be configured to invoke chatbot DA process 113 and/or webpage DA process 114 at timed intervals, e.g., once a day, once per hour, and the like.

In some use cases, only one of chatbot DA process 113 or webpage DA process 114 can be determined to be invoked at block 1101. In the use case depicted in the flowchart of FIG. 3, the use case is described where each of chatbot DA process 113 and webpage DA process 114 are invoked for purposes of illustration. On the determination that chatbot DA process 113 has been invoked at block 1101, enterprise system 110 can proceed to block 1102. At block 1102, enterprise system 110 can send triggering data to chatbot DA process 113 so chatbot DA process 113 is initiated.

On the receipt of triggering data, chatbot DA process 113 can proceed to block 1131. At block 1131, chatbot DA process 113 can examine programming data defining webpage serving application 111 having one or more webpage. At block 1131, chatbot DA process running on enterprise system 110 can examine programming data features of text based markup language programming data defining webpages of webpage area 2121 to provide webpage action state tree data structure A10 as indicated in FIG. 2A. Chatbot DA process 113 at block 1131 can examine programming data defining the set of webpages to identify program features that define e.g., a homepage, link activation buttons for linking to landing pages expressed on the homepage, any link activation buttons associated to the landing pages, and any other link activation buttons. Chatbot DA process 113 at block 1131 can assign the homepage to root node A100 as indicated in FIG. 2A, can assign each landing page accessible by a link activation button on the homepage to respective first order nodes A201-A205, and can assign links to respective edges between the homepage and landing page first order nodes based on identification of the homepage link activation buttons linking to the respective landing page nodes. Chatbot DA process 113 can also assign landing pages accessible from the landing page associated to first order node A201, respective second order nodes A310-A303, and can assign links to the various edges between landing page node A201 and landing page nodes A301-A303 based on link activation buttons identified within the landing page of node A201 (the landing page text based content A201T specifying CJI, LPI, and ABI can be configured to be active). For performance of block 1131, enterprise system 110 can perform data queries on data repository 108 which can respond to such queries at receive/respond block 1081.

Figure 2C:
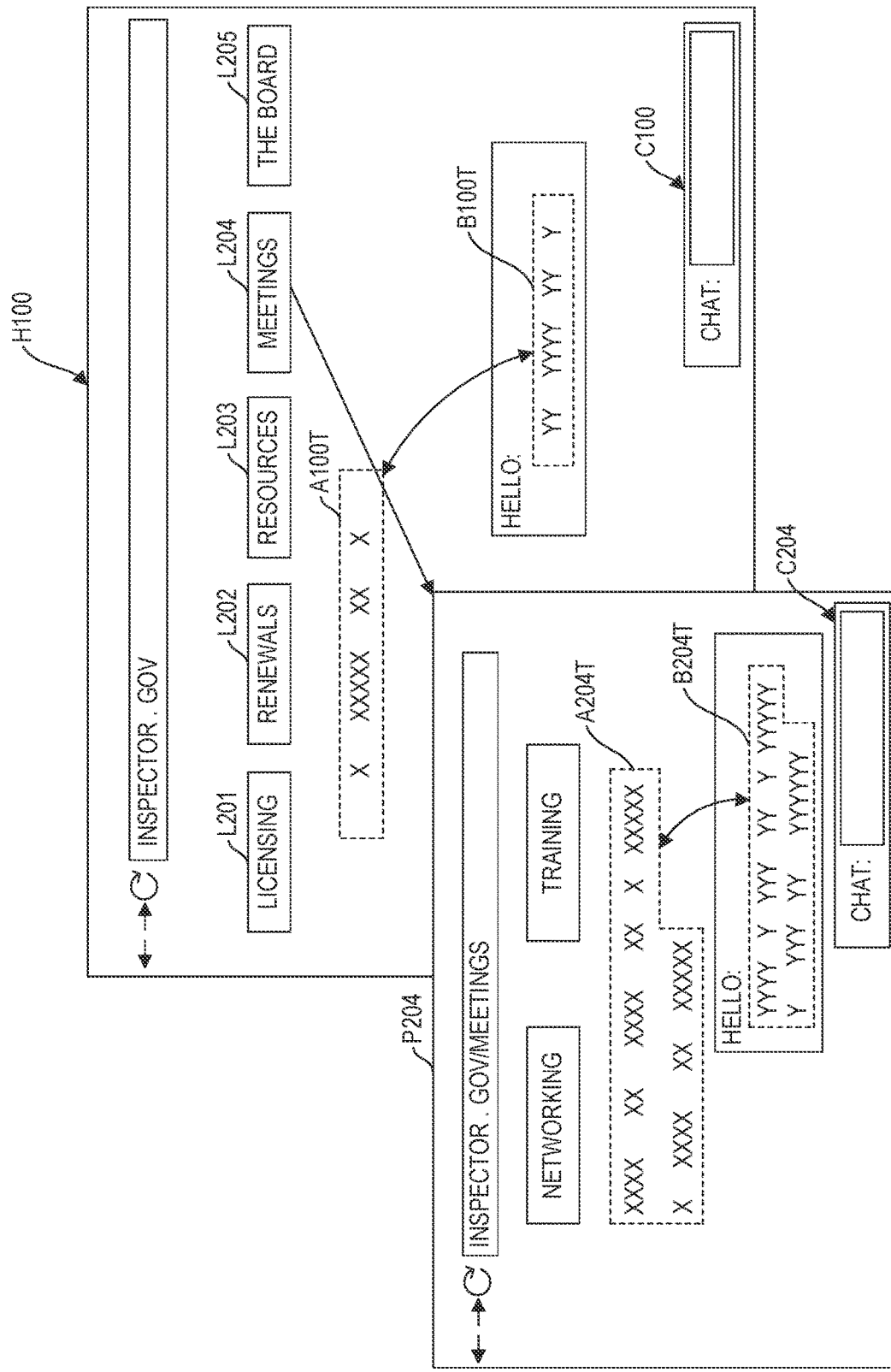
FIG. 2C depicts a set of webpages served by a webpage serving application according to one embodiment.

As indicated in FIG. 2A, chatbot DA process 113 can specify a subject label for each landing page that is assigned to a node and to each link that is assigned to an edge of webpage action state tree data structure A10. Enterprise system 110 running chatbot DA process 113 to assign a subject label for each landing page node can include enterprise system 110 extracting text associated to a link activation button for activation of the landing page. For example, with reference to FIG. 2A and FIG. 2C illustrating a set of webpages associated to webpage action state tree data structure A10, the subject labels "licensing", "renewals", "resources", "meetings", and "the Board" can be expressed as link active buttons on a homepage. Enterprise system 110 can extract the described text based subject labels and apply them as labels for landing tree nodes A201-A205. Enterprise system 110 can apply the same labels for the respective edges of webpage action state tree data structure A10 connected to the respective landing page nodes A201-A205 for access to the respective landing pages associated to the landing page nodes A201-A205. Enterprise system 110 can label homepage node A100 according to the domain of a set of webpages.

In providing the webpage action state tree data structure as indicated in FIG. 2A, enterprise system 110 running chatbot DA process 113 can associate text based data with each of the assigned webpage nodes. Embodiments herein recognize that the homepage of a set of webpages on a website can have text based content A100T, and that landing pages that are linked to the homepage or another landing pages can also have associated text based content A201T-A205T, A301-A301T, e.g., descriptive text that is presented to a user on viewing the webpage, as shown by the exploded view text based content A201T of FIG. 2A. Extracted text based content herein extracted for inclusion as text based content in an action state tree data structure A10, B10 can be provided, e.g., by copied text copied from underlying programming data or by pointers to such programming data defining the text based data.

Embodiments herein recognize that a hierarchical order of links on a set of webpages can be useful in organizing the hierarchical order of intents of the chatbot application and that the subject associated to the various links in a set of webpages can be useful in defining intent topics of a chatbot application.

Embodiments herein also recognize that text based data associated to a homepage and landing pages defining a set of webpages can be useful in defining conversation stage prompting data text associated to the opening condition conversation stage and additional conversation stages tiered under the opening condition conversation stage. Embodiments herein recognize that sets of webpages of an enterprise website as well as sets of prompting data of a chatbot application tend to feature a hierarchical data organization tiered under a main subject with lower orders of subjects ordered under a root subject. Embodiments herein recognize that a chatbot application for an enterprise can be configured to feature a common hierarchical organization of subjects as a chatbot application and vice versa.

In performance of block 1131, chatbot DA process 113 can also examine programming data defining chatbot application to return chatbot dialog action state tree data structure B10 for chatbot application 112 as shown in FIG. 2B. In performance of block 1131, chatbot DA process 113 can identify programming data features within programming data defining chatbot application 112 that provide (a) an opening condition conversation stage for the chatbot application (b) opening condition candidate intents associated to the opening condition, and (c) conversation stages associated to the respective opening condition candidate intents. Chatbot DA process 113 can also identify programming data features for providing lower tiered intents and associated conversation stages associated to such intents.

Based on the identified conversation stages and intents, chatbot DA process 113 can assign conversation stages to nodes of chatbot dialog action state tree data structure B10 and intents to edges of the chatbot dialog action state tree data structure B10 as shown in FIG. 2B. Enterprise system 110 running chatbot DA process 113 can assign the identified opening condition conversation stage to root node B100, can assign candidate intents to the edges connecting the root B100 to first order nodes B201-B205, and can further assign intent associated conversation stages to first order nodes B201, B202, B203, B204, and B205. Chatbot DA process 113 can further assign lower tiered intents and conversation stages to lower tiered edges and nodes as indicated in FIG. 2B.

Embodiments herein recognize that an opening condition conversation stage of a chatbot application as well as intent associated conversation stages of a chatbot application can have associated text based content, e.g., the text based data that is expressed by a chatbot when the opening condition or when an intent is invoked. For example, referring to the chatbot dialog action state tree data structure of FIG. 2B, a chatbot can present the prompting data response conversation stage indicated by text based data B100T when the opening condition is invoked and can present the intent driven conversation stage response prompting data of text based data B201T when the intent leading to activation of conversation stage node B201 is invoked. For building chatbot dialog action state tree data structure B10, enterprise system 110 can parse text based content associated to an opening condition conversation stage, and downstream conversation stages associated to the various candidate intents of a chatbot application, for association to various nodes as text based content, B100T, B201T-B205T, B301T-B303T, indicated in FIG. 2B.

Embodiments herein recognize that intents of a chatbot application can have associated subjects and user reply data can be processed for classification into one of the various intents that are associated to chatbot prompting data of a certain conversation stage. Chatbot DA process 113 can examine programming data of a chatbot application to identify text based names of defined intents and can use such names as subject labels for populating labels of the various nodes and edges of the chatbot dialog action state tree data structure depicted in FIG. 2B. Referring to FIG. 2B, enterprise system 110, in providing chatbot dialog action state tree data structure, can assign subject labels to edges based on intent names identified by examining chatbot application programming data and can assign subject labels to conversation stage nodes according to the intents that drive the various conversation nodes. Enterprise system 110 can apply a domain label to the root node.

Further, at block 1131, chatbot DA process 113 can subject extracted text extracted for each respective webpage node of the webpage action state tree data structure of FIG. 2A and each respective conversation stage of the chatbot dialog action state tree data structure of FIG. 2B to natural language processing for output of NLP output parameters. NLP output parameter values can include NLP output parameters specifying for text based content, e.g., extracted topics, extracted sentiment, and extracted part of speech tags. For each respective node of a webpage action state tree data structure or chatbot dialog action state tree data structure, there can be provided extracted text based content associated to the node as well as a set of NLP output parameter values associated to the text based content.

On completion of block 1131, chatbot DA process 113 can proceed to compare block 1132. At compare block 1132, chatbot DA process 113 can compare the generated webpage action state tree data structure of FIG. 2A to the chatbot dialog action state tree data structure of FIG. 2B for identification of differences therebetween. For performance of block 1132, enterprise system 110 can perform data queries on data repository 108 which can respond to such queries at receive/respond block 1083. Chatbot DA process 113 at block 1132 can establish mapping data structures, e.g., webpage action state tree data structure A10 and chatbot dialog action state tree data structure B10 to facilitate comparison between a chatbot dialog action state tree data structure and a webpage action state tree data structure. Chatbot DA process 113 in providing mapping data can also provide a mapping data structure as set forth below in Table A.

indicated by the designations of "Missing" in Table A. Chatbot DA process 113 can determine that there is a missing node missing from chatbot dialog action state tree data structure B10 when there is no conversation stage node within chatbot dialog action state tree data structure B10 associated to an established generic node within the Table A mapping data.

On completion of block 1132, chatbot DA process 113 can proceed to transform block 1133. At transform block 1133, chatbot DA process 113 can transform text-based data from a webpage of a webpage serving application 111 for use as chatbot response prompting data. Referring again to block 1132, chatbot DA process 113 at block 1132 can identify as a node for adding into chatbot application 112 a node designated as a missing node of chatbot application 112 in Table A. At transform block 1133 chatbot DA process 113 can transform text based data from the webpage action state tree data structure associated to an identified missing node a chatbot application 112 identified at block 1132. For performance of transformation of the text-based content at transform block 1133, chatbot DA process 113 can transform text associated to the webpage action state tree data structure A10 of FIG. 2A use in a chatbot application.

Embodiments herein recognize that text based content associated to landing pages on set of website webpages can be adapted for use as conversation stage response prompting data in a chatbot application. For example, if a user navigates through a set of webpages on a website in the scenario depicted in FIGS. 2A and 2B and clicks on a link with the subject called "Renewals", a user might be presented with information in the described scenario about obtaining a renewal of an inspector license. Embodiments herein recognize that the experience of a user interacting with

TABLE A

| Row | Generic node | Webpage tree node | Webpage tree parent (link edge description) | Webpage tree text | Chat tree node | Chat tree parent (intent edge description) | Chat tree text |
| --- | --- | --- | --- | --- | --- | --- | --- |
| 1 | G100 | A100, Homepage | NA | XXXX | B100 | NA | XXXX |
| 2 | G201 | A201, Licensing | A100 | XXXX | B201, Licensing | B100 | XXXX |
| 4 | G203 | ABSENT | ABSENT | ABSENT | B203, Resources | B100 | XXXX |
| 6 | G205 | A205, The Board | A100 | XXXX | MISSING | MISSING | MISSING |
| 9 | G303 | A303, ABI | A201 | XXXX | MISSING | MISSING | MISSING |

Referring to Table A, chatbot DA process 113 can establish a generical node, e.g., G100, G201, etc., for each node of a webpage action state tree data structure and each node of chatbot dialog action state tree data structure. When establishing a generical node, enterprise system 110 can assign to the generical node a subject label according to the subject label of its associated tree data structure node. Where enterprise application 110 determines that a certain node of the chatbot tree data structure and a particular node of the webpage action state tree data structure have a common subject label and are located in a common node order in their respective hierarchies, enterprise system 110 can assign and associate each of the commonly labeled certain node and the particular node to the same generical node. When tabulation is complete using the data structure of Table A, chatbot DA process 113 can identify missing nodes that are missing from the chatbot dialog action state tree data structure which are included in the webpage action state tree data structure, as webpages might be similarly reconstructed in a chatbot environment. For example, in the described scenario of FIG. 2A to 2B, a user might reference that the user is interested in renewals, which will be recognized as an intent by the chatbot application. In response, conversation stage prompting data can be delivered by a chatbot relating to how renewals can be obtained.

Embodiments herein recognize, however, that there can be differences in optimized chatbot interactions relative to optimized web browsing interactions. For example, embodiments herein recognize that in a chatbot scenario wherein interactions can be more dependent on constant user engagement, less formal language can be optimally deployed by a chatbot to encourage flow of conversation between a chatbot and the user, and to assure the continued attention level of the user with respect to the interaction. Embodiments herein recognize use of formal language in a webpage serving setting can be optimal given that interactions can be less dependent on continual engagement of a user. Accordingly, for performing transformation at transform block 1133 according to one embodiment, chatbot DA process 113 can examine a thesaurus resource, which can be stored in data repository 108, and which can include a list of less formal synonymous terms mapped to more formal synonymous terms. Chatbot DA process 113 can use the part of speech tags extracted at block 1131 in combination with the described thesaurus resource for performance of transformation at block 1133.

For a baseline level of transformation, chatbot DA application process 113 at block 1133 can use part of speech tags to perform transformation with respect to one or limited types of tagged words tagged with a word type tag, e.g., just adjectives, just nouns, just verbs. For example, for a baseline transformation at block 1133, chatbot DA process 113 can replace just verbs (or just adjectives or just nouns) from webpage-based content within formalized versions of the words based on lookup from the described thesaurus resource in data repository 108. The thesaurus resource can include a pre-tagged synonymous term list, wherein respective terms of synonymous term sets are designated as being more formal or less informal.

For performance of block 1133, chatbot DA process 113 can select informal terms from such list. In a more advanced transformation, chatbot DA process 113 can perform replacement of an expanded list of word types, e.g., for adjectives, verbs and nouns, based on part-of-speech tagging and lookup from a pre-tagged synonymous term list from the described thesaurus resource. Chatbot DA process 113 can dynamically adjust the level of transformation based on a detected current sentiment of the user, which can be extracted by subjecting most recent text data input of the user to natural language processing for sentiment extraction. When current user sentiment is more negative than a neutral level, enterprise system 110 can increase the level of transformation (e.g., adding tag types) from the baseline level to increase a comfort level of a user.

On completion of block 1133 chatbot DA process 113 can proceed to block 1134. At block 1134, chatbot DA process 113 can generate update data for updating chatbot application 112 in dependence on the examining performed at block 1131 to the comparing performed at block 1132 and the transforming performed at transform block 1133. The update data can take the form, e.g., of development prompting data that prompts a developer user to perform an update of programming data defining a chatbot application.

In another example, chatbot DA process 113 at generate block 1134 can generate update data in the form of program code data for installation into chatbot application 112 as an extension of chatbot application 112. In the case that the update data is provided by development prompting data, the prompting data can include text based content that specifies to a developer user the additional conversation stages and/or intent associated to "Missing" nodes as specified in Table A that are recommended by enterprise system 110 for adding to an existing chatbot application.

The prompting data update data can also include text-based content defining chatbot response prompting data. The text-based content can be the text based content resulting from performance of transform block 1133.

In the case that the update data is provided by program code data, the generated update data generated at block 1134 can take the form of program code written in the source code language of the existing one or more program defining chatbot application 112. For such functionality, chatbot DA application process 113 can run a mapping utility that maps identified missing conversation stage nodes and text based content to program code segments for establishing within chatbot application programming data conversation stages associated to the identified missing conversation stage nodes, and intents associated to the identified missing conversation stage nodes. On completion of block 1134 chatbot DA process 113 can proceed to block 1135. At block 1135, chatbot DA process can provide one or more output based on the generated update data generated at block 1134.

Output data output at block 1135 can include prompting data sent to a developer-user of UE device 120A in the case that the generated update data includes development prompting data and/or can output to data repository 108 program code in the case that the generated update data includes chatbot application program code. Enterprise system 110 can be configured so that the program code received by enterprise system 110 by the output at block 1135 is installed on receipt at storage block 1085 as an extension to the existing programming data defining chatbot application 112.

Referring to Table A in FIGS. 2A and 2B in the described example relating to an inspector website having a set of served webpages and a chatbot portal, chatbot DA process 113 at block 1132 can identify that an existing chatbot application is missing conversation stage node A205 shown in FIG. 2A. Accordingly, update data generated at block 1134 can include update data to add to the existing chatbot application a new conversation stage according to the identified missing conversation stage node indicated by B205 of FIG. 2B, which conversation stage node is associated by the described mapping data of FIG. 2A, 2B and Table A to webpage node A205 of the webpage data tree structure A10 FIG. 2A. The update data generated at block 1134 can include with the added conversation stage specified by new node B205 transformed text based content transformed at transform block 1133, as well as a new intent with subject label of the new conversation stage, detected for in response to presentment of the prompting data of the opening condition conversation stage. The transformed text based content can be transformed based on text based content A205T, e.g., landing page content associated to webpage node A205 of the webpage action state tree data structure of FIG. 2A.

With further reference to Table A and FIG. 2B, enterprise system 110 can determine that conversation stage node B303 is missing from chatbot application B10 and accordingly enterprise system 110 at generate block 1134 can generate update data to add the missing node as well as transformed text based content transformed based on text based content A303T of webpage node A303 for webpage action state tree data structure A10 of FIG. 2A. Chatbot DA process 113 at compare block 1132 can identify that a conversation stage node associated to webpage node A303 is missing from the chatbot dialog action state tree data structure of FIG. 2B. Accordingly, update data generated at block 1134 can include update data to generate the added conversation stage node specified by conversation stage node B303 of FIG. 2B, and to include with the new conversation stage node as chatbot response prompting data transformed at transform block 1133 based on text based content, A303, e.g., landing page text based content associated to webpage node A303 of the webpage action state tree data structure A10 of FIG. 2A. The update data can also include update data to provide the missing intent associated to the missing conversation stage, detected for in response to presentment of the prompting data associated to conversation stage node A201.

It was described in connection with blocks 1131-1135 that chatbot DA process 113 can be used to update a chatbot application based on attributes of a webpage application. In another aspect, webpage DA process 114 can be run to update a webpage serving application in dependence on attributes of a chatbot application. In the scenario described with reference to the flowchart of FIG. 3, webpage DA process 114 can be triggered contemporaneously with chatbot DA process 113. In response to webpage DA process 114 being determined to be invoked at block 1101, enterprise system 110 can proceed to block 1103 to send triggering data for triggering webpage DA process 114.

In response to the triggering data, the webpage DA process can proceed to examining block 1141. At examining block 1141, webpage DA process 114 can examine programming data defining chatbot application and programming data defining webpage serving application 111 in the manner described with reference to block 1131 to provide an updated chatbot dialog action state tree data structure shown in FIG. 2B and a webpage action state tree data structure as described in FIG. 2A. In fact, if updated versions of the webpage action state tree data structure and the chatbot dialog action state tree data structure are sufficiently current, e.g., performed at block 1131, processing to determine updated chatbot dialog action state tree data structure and webpage action state tree data structures at block 1141 can be avoided.

At block 1141, webpage DA process 114 can extract text-based content associated to all nodes of the chatbot dialog action state tree data structure and the webpage action state tree data structure as described previously in respect to block 1131. Webpage DA process 114 at block 1141 can further subject all extracted text to natural language processing to provide for extracted text various natural language processing parameter value tags, e.g., topic tags, sentiment tags, and part of speech tags. Again, text extraction and natural language processing at block 1141 can be avoided if updated versions of the chatbot dialog action state tree data structure and webpage action state tree data structures are sufficiently current.

On completion of block 1141, webpage DA process 114 can proceed to block 1142. At block 1142, webpage DA process 114 can use mapping data of a mapping data structure as described in connection with FIG. 2A, FIG. 2B and Table A to identify nodes that are missing from a webpage action state tree data structure A10 that are included in an associated chatbot dialog action state tree data structure B10. With reference to Table A, these missing nodes can be designated with the designator "ABSENT". In one example, the webpage action state tree data structure A10 can be determined at compare block 1142 to be missing a webpage node mapping to conversation stage node B203 of the chatbot dialog action state tree data structure shown in FIG. 2B. On completion of compare block 1142, webpage DA process 114 can proceed to transform block 1143. Transform block 1143 can be performed in the manner of transform block 1133 except that an inverse operation can be performed. Specifically, instead of transforming text from the webpage node of a webpage serving application into a less formal form for use in a recommended new node corresponding to the certain webpage node of the webpage serving application, webpage DA process 114 at transform block 1143 can transform text from a certain conversation stage node of chatbot application identified at block 1142 as having no corresponding webpage node in a webpage application into a more formal format. Referring to the processing at transform block 1133, the processing at transform block 1143 can include use of the described pre-tagged synonymous term list of the referenced thesaurus resource stored in data repository 108 having synonyms pre-tagged with indicators indicating whether synonymous terms are more formal or less formal.

Enterprise system 110 according to one embodiment can perform transform blocks 1133 and/or 1143 with use of a computational linguistics paraphrasing tool which performs generation of paraphrases. Paraphrase generation can be performed with use of e.g., paraphrase-based machine translation, multiple sequence alignment, and/or long short-term memory (LSTM). Phrase based machine translation can include e.g., aligning phrases in a pivot language to generate candidate paraphrases in an original language. Multiple sequence alignment can include clustering similar sentences together using n-gram overlap. Recurring patterns can be identified within clusters using multiple sequence alignment wherein the position of argument words can be determined if finding and identifying areas of high variability within respective clusters. Employing long/short-term memory can include use of long/short-term memory (LSTM) models for generation of paraphrases. An LSTM model can be provided which includes an encoder and decoder. Employing long short-term memory can include providing an encoder LSTM and decoder LSTM. The encoder LSTM can encode all words in a sentence as input for generation of a final hidden vector. The decoder LSTM, in turn, can receive the hidden vector as input to generate a new sentence. In one embodiment, enterprise system with use of the described computational linguistics paraphrasing tool can generate multiple candidate paraphrases and text that is to be transformed from webpage serving application 111 to chatbot application 112, or vice versa. A transformation, in one embodiment, can be performed, e.g., on a sentence by sentence or segment by segment basis. Candidate paraphrases can be voted on and scored with use of the described thesaurus resource in which various terms are tagged with designators to designate whether a term is more formal or less formal. With use of the described scoring, the candidate paraphrase text having the highest count of less formal terms can be selected as the transformation for webpage to chatbot transformation and the candidate transformation having the highest count of more formal terms can be selected as the transformation in the case of chatbot to webpage transformation.

On completion of transform block 1143, webpage DA process 114 can proceed to generate block 1144. At generate block 1144, webpage DA process 114 can generate update data for updating chatbot application. Like the generated update data generated at block 1134, the update data generated at block 1144 can include, e.g., development prompting data update data, and/or program code update data. The development prompting data can prompt the developer user to implement a recommended change in programming data defining a chatbot application. The program code update data can include program code for installation in the current programming data defining chatbot application 112. The program code data update data can include program code to implement an extension in current programming data, e.g., encoded webpages defining webpage serving application 111. In one embodiment, update data generated at block 1144 can include update data to implement changes in a webpage serving application 111 so that a webpage action state tree data structure A10 has webpage nodes corresponding to all identified conversation stage nodes identified in a chatbot application and specified in the chatbot dialog action state tree data structure B10 of FIG. 2B.

In the particular example of the website described in reference to FIGS. 2A and 2B, the webpage action state tree data structure A10 can be determined to be absent of webpage node corresponding to conversation stage node B203, and accordingly, update data generated at block 1144 can include update data to add a new landing page to the set of webpages defining webpage serving application 111 so that a webpage action state tree data structure for webpage serving application 111 includes a webpage node, i.e., webpage node A203 associated to the identified conversation stage node B203 and further includes transformed text based content (more formalized version) of the text based data B203T (chatbot response prompting data) associated to conversation stage node B203. The update data can include update data to add a webpage link activation button to a set of webpages webpage link activation buttons on the homepage of homepage webpage node A100 for linking access to the new landing page.

On completion of generate block 1144, webpage DA process 114 can proceed to output block 1145. At output block 1145, webpage DA process 114 can output prompting data to a developer user at UE device 120A and/or can output webpage program code to data repository 108. Enterprise system 110 can be configured so that the webpage program code output at block 1145 at storage block 1086 is installed into existing programming code defining webpage serving application 111 for defining an extension to webpage serving application 111. On completion of block 1145, enterprise system 110 can proceed to return block 1146. At return block 1146, enterprise system 110 can return to a stage prior to block 1141 to wait for a next triggering communication.

By use of mapping data herein, update data to add an intent to a chatbot application can specify a hierarchical order location for the intent based on a hierarchical ordering of an associated webpage link activation button in a set of linked webpages. By use of mapping data herein, update data to add a conversation stage to a chatbot application can specify a hierarchical order location for the conversation stage based on a hierarchical ordering of an associated webpage in a set of linked webpages. By use of mapping data herein, update data to add a webpage link activation button to a webpage serving application can specify a hierarchical order location for the webpage link activation button based on a hierarchical ordering of an associated intent in a chatbot application. By use of mapping data herein, update data to add a webpage to a webpage serving application can specify a hierarchical order location for the webpage based on a hierarchical ordering of an associated conversation stage in a chatbot application With reference to blocks 1132 to 1135 and blocks 1142 to 1145 an entire chatbot application and/or an entire webpage serving application can be spawned spontaneously even in the absence of an existing chatbot application or webpage serving application. For example, if on the examining and comparing blocks 1131 and 1132 it is determined that no chatbot application exists (all webpage action state tree data structure nodes are missing from a chatbot action state dialog tree data structure B10) such chatbot application can be automatically spawned and provisioned to have conversation stage nodes corresponding to identified homepage and landing pages of a webpage application and transform text based on text associated with such webpages. Similarly, if on the performance of examining block 1141 and compare block 1142 (all chatbot dialog action state tree data structure nodes are missing from webpage action state tree data structure A10), it is determined that enterprise system 110 is absent of a webpage application, a webpage can be spontaneously and automatically spawned to include links according to the hierarchy of identified chatbot application intents and transformed text based on text of the identified respective conversation stages intents of the chatbot application.

Embodiments herein recognize that with the establishing of the mapping defined by the corresponding hierarchical tree diagram data structures described in reference to FIGS. 2A and 2B and with the mapping data of Table A, various beneficial functionalities can be facilitated. In another aspect, enterprise system 110 can use mapping data defining mappings between a generated chatbot dialog action state tree data structure and a webpage data tree data structure for augmentation of live webpage serving and corresponding webpage browsing sessions (the client end of webpage serving application 111) and for augmentation of live chatbot sessions.

Enterprise system 110 as shown in FIG. 1 can run serving augmentation process 115 for augmentation of a live webpage serving and webpage browsing session and can run chat augmentation process 116 for augmentation of a live chatbot session.

Figure 4:
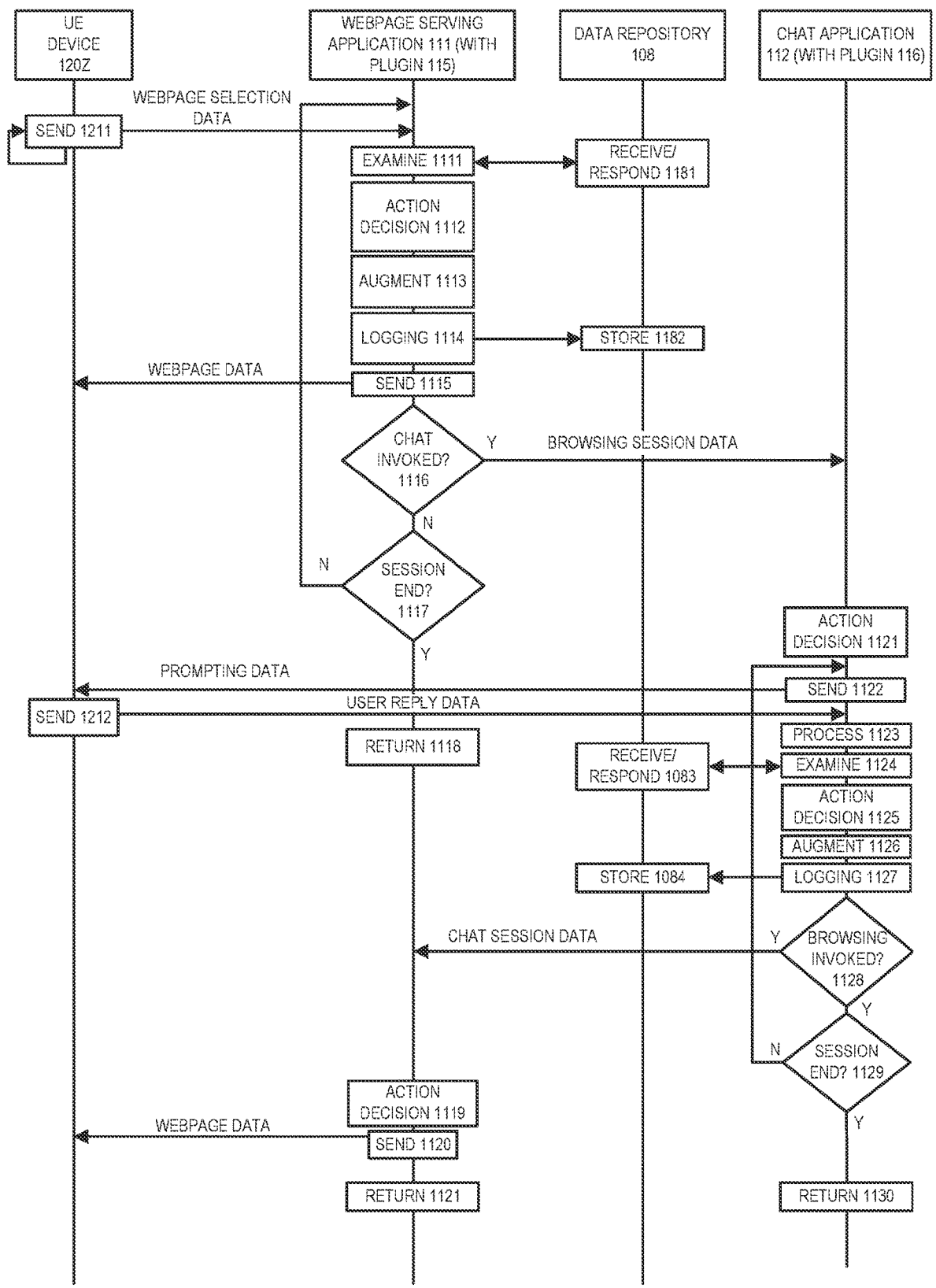
FIG. 4 is a flowchart illustrating a method for performance by an enterprise system interoperating with a UE device according to one embodiment.

While many use cases are envisioned, the flowchart of FIG. 4 depicts a use case scenario in which webpage browsing session and chatbot session are invoked. As explained with reference to FIG. 1, enterprise system 110 for each browsing session and each chatbot session can be iteratively logging in session logging data for each into logging area 2224.

As noted in respect to FIG. 1, the logging data of logging area 2124 can log each webpage serving session served by enterprise system 110 according to user and times. Session logging data can specify, e.g., the set of webpages visited by a user during a session, a set of actions taken by a user during this during a session, and the input data by a user during a session. The logging data can store the order of webpages visited and actions taken by a user to navigate between webpages. logging area 2224 can store chatbot session logging data. Chatbot session logging data of logging area 2224 can be stored according to user and session time. The chatbot session data can store text-based data for each session indicating an entirety of conversation between a chatbot and a user during a chatbot session. The chatbot logging data can include data specifying a user of a session and times of the session. The chatbot logging data can include labels indicating a conversation stage associated to each respective instance of chatbot prompting data and user response data. The conversation stage can be specified based on the hierarchical data organization of chatbot session, e.g., chatbot subjects mapping to intents arranged under an opening condition. In one embodiment, all of the logging data of logging area 2124 and logging area 2224 can be subject to natural language processing to attach natural language processing parameter value tags to all text based conversation data, including, e.g., topic tags, sentiment tags, and part of speech tags.

Referring to the flowchart of FIG. 4, UE device 120Z, in this case being used by an end user, can be iteratively sending webpage selection data at block 1201, i.e., user can be activating link activation buttons to navigate to different webpages on a website. At examine block 1111, webpage serving application 111 (with plug-in serving augmentation process 115) can be examining the current page being viewed in connection with chatbot data for the current user stored in logging data of logging area 2224 for historical chatbot sessions of the user. The examining at block 1111 can include examining with reference to the described mappings between a webpage action state tree data structure A10 as shown in FIG. 2A, the chatbot dialog action state tree data structure B10 as shown in FIG. 2B, and/or the mapping data structure of Table A.

At action decision 1112, webpage serving application 111 can determine whether to augment a currently served webpage being served to a user of UE device 120Z in dependence on the examining at block 1111.

In one example of action decision block 1112, webpage serving application 111 at action decision block 1112 can, using the mapping data described with reference to FIGS. 2A and 2B and/or Table A, determine whether a chatbot application intent associated to a webpage link activation button of a webpage currently being presented, was based on an examination of historical chatbot session logging data for the current user derived as an intent of a user during a recent e.g., within a threshold time at session of the user. On determining, using mapping data of FIGS. 2A and 2B and Table A mapping webpage nodes of a webpage serving application to conversation stage nodes of a chatbot application, that a webpage link activation button on a currently served webpage maps to an invoked intent of a recent chatbot session of the user, webpage serving application 111 at action decision block 1112 can determine that text-based data associated to the webpage link (e.g., activation button) should be augmented, e.g., presented in highlight. The highlight can comprise, e.g., enlarged font, flashing font, a different color font, bold font, and the like. The highlighted text can also include added text which states with a popup proximate the active button "You asked about this in recent chatbot session."

In another example, webpage serving application 111 at examine block 1111 can identify user reply data within chat logging data associated to currently displayed text data of a currently served webpage. Such reply data of a user in the historical chatbot session can be the reply data replied with by the user in response to chatbot prompting response data of a chatbot session associated to the currently displayed text of the currently displayed webpage.

On the identification of matching topics between the user reply data and the text data of the currently displayed webpage, webpage serving application 111 at action decision block 1112 can determine to highlight text defining the matching topics, e.g., by presenting an enlarged flashing or different color font. Thus, when viewing served webpages, the user will be queued in as to topics of interest to the user in a historical recent chatbot session of the user. On completion of action decision block 1112, webpage serving application 111 can proceed to augment block 1113.

At augment block 1113, webpage serving application 111 can format revised and modified webpages for serving to the user, in accordance with the action decision at block 1112. On completion of augment block 1113, webpage serving application 111 can proceed to logging block 1114. At logging block 1114, webpage serving application 111 can store updated logging data specifying changed state of a current web browsing session and webpage serving session, e.g., updated to include the most recent clicks and other actions of a user as well as served webpages to the user, including any enhanced webpages served to user. The new logging data can be stored into data repository 108 of block 1182.

On completion of block 1114, webpage serving application 111 can proceed to block 1115. At block 1115, webpage data defining the webpage augmented and formatted at block 1113 can be sent for presenting to UE device 120Z of the end user.

Webpage serving process 111 at block 1117 can determine whether the webpage serving session has been ended. Webpage serving application 111 can iteratively perform the loop of blocks 1111-1117 until the current webpage serving application has been ended, e.g., by user action.

Prior to block 1117 at block 1116, webpage serving application 111 can determine whether a chatbot session has been invoked by a user. In one embodiment, the webpage can be configured to have a chatbot session portal located, e.g., at a corner of a displayed webpage as shown in FIG. 2C. On actuation of the chatbot portal, a chatbot session can be invoked. On the determination at block 1117 by webpage serving process 111 that a chatbot session has been invoked by the user, webpage serving application 111 at block 1117 can send browsing session data to chatbot application 112 (operating with chat augmentation process 116 as a plug-in), which is invoked on receipt of the browsing session data.

Browsing session data sent at block 1117 can specify the current state of the webpage browsing session of the user and the corresponding webpage serving session of enterprise system 110. For providing the browsing session data at block 1116, webpage serving application 111 can read recent logging data stored at block 1182. The browsing session data can reference the current webpage currently being viewed by a user during the web browsing session which current webpage can include a hierarchical order described with reference to three diagrams of FIGS. 2A and 2B can have associated links that are associated to specific nodes of the webpage action state tree data structure of FIG. 2A, which referenced webpage action state tree data structure nodes have corresponding nodes in the chat dialog tree data structure explained with reference to FIG. 2B. The logging data of block 1114 can specify the node order (FIG. 2A) of the currently served webpage.

Based on the described browsing session data, chatbot application 112 at action decision block 1121 can select chatbot response prompting data response data to present to the user. Depending on the current state of the current web browsing session and the described mapping data mapping webpage serving application data chatbot application data described between reference to FIGS. 2A and 2B and/or Table A, chatbot application 112 at block 1121 can determine to present to the user response prompting data other than prompting data associated to opening condition node B100, as explained with reference to FIG. 2B.

For example, if the user as referenced in the browsing session data sent at block 1116 is currently viewing the landing page B201 having text D201T described with reference to FIG. 2B chatbot application 112 at action decision block 1121 can determine to present to the user chatbot conversation stage response prompting data associated to conversation stage node B201 (FIG. 2B) which node maps to the described webpage node A201 associated to the current landing page being viewed.

Referring to FIG. 2C, webpage serving application 111 can serve data webpages including homepage H100 and landing page P204 as shown in FIG. 2C. Referring to homepage H100, homepage can present homepage text A100T and on calling of chatbot application 112 with use of chat portal C100 opening condition chatbot text B100T can be displayed. In some embodiments, chatbot text B100T can include transform text transformed from homepage text A100T. In one embodiment, homepage text A100T can include transformed text transformed based on chatbot text B100T by activation of link button L204, landing page P204 can be displayed. Landing page P204 can include chatbot portal C204. As explained with reference to block 1116, chatbot portal C204 can be activated and the current state of the current browsing session is characterized by landing page P204 being displayed. In the case that chat portal C204 is activated with landing page P204 being displayed, chatbot prompting data can be provided by text B204T associated to chat node B204 as shown in FIG. 2B instead of prompting data associated to root node B100 shown in FIG. 2B. The prompting data text based content B204T can be transformed text transformed based on text A204T associated to landing page P204, or in some use cases, the text based text A204T can be transform text transformed based on text B204T.

In the described scenario, chatbot application 112 at action decision block 1121 at the initiation of a chatbot session can determine to present chatbot response prompting data defined by text B201T of conversation stage node B201 of the chatbot dialog action state tree data structure of FIG. 2B rather than opening condition (main greeting) chatbot response data. On completion of action decision block 1121, chatbot application 112 can proceed to send block 1122 and at send block 1122 chatbot application 112 can send the selected prompting data for presentment to the user on UE device 120Z, namely the prompting data defined by text B201T of conversation stage node B201 mapping to webpage node A201 in the current and the last viewed landing webpage of the user.

In the described scenario, the user can be advantageously presented with a chatbot session that begins not with a general opening condition conversation stage greeting, but rather with conversation stage response prompting data that is intelligently selected to correspond precisely to the particular webpage content currently being viewed by the user during a web browsing session in which a chatbot session is invoked.

On completion of performance of send block 1122, chatbot application 112 can proceed to process block 1123. At process block 1123 chatbot application 112 can process user reply data of a user sent at block 1212 in response to the presented chatbot response prompting data sent at block 1122. At process block 1123, chatbot application 112 can process user reply data provided in response to the prompting data sent at block 1122. The processing described in block 1123 can include processing to provide candidate meanings associated to the received user reply data. In some use case situations, the candidate meanings can each have low confidence levels that are below a threshold which would result in auto selection of one of the meanings as an intent. On completion of process block 1123, enterprise system 110 can proceed to examine block 1124. At examine block 1111 chatbot application 112 can examine data repository 108 for historical web browsing history logging data, e.g., including logging data of logging area 2124 specifying clicks and viewed webpages of a user during a historical browsing sessions. The examining can include selective examining of web browsing history that is associated to current stage of response prompting data of the current chatbot session, i.e., the examined web browsing history can be selective to web browsing history with respect to actions and webpages associated to node of webpage action state tree data structure A10 that is of the same node order (and has a common generical node with) of the node of chat dialog tree data structure B10 associated to the current conversation stage.

According to an aspect herein, chatbot application 112 in such a scenario can use historical webpage browsing session logging data associated to the current chatbot session stage mapping to a particular node of FIG. 2B to resolve and select one of the described candidate meanings each below a threshold for extraction of an intent. In one scenario at action decision block 1125, chatbot application 112 can selectively examine webpage browsing history logging data and can determine that a first of the described candidate meanings does not correspond to a link previously selected by the user during a historical web browsing session, while the second candidate meaning does in fact correspond to a link activated by a user during a historical web browsing session. In such a situation, chatbot application 112 can select the second candidate meaning as the intent expressed by the user.

At augment block 1126, chatbot application 112 can augment the current chatbot session based on the action decision at block 1125. In the described example, chatbot application 112 at augment block 1126 can establish next conversation stage prompting data response data to the user in accordance with the selected second candidate intent from the first and second candidate intents. On completion of augment block 1126, chatbot application 112 can proceed to block 1127 to perform logging of the current chatbot session, and logging data can be correspondingly stored by data repository at block 1084. The chatbot session logging data can specify the node order on chatbot dialog action state tree data structure B10 of the current conversation stage of the current chatbot session.

At block 1129, chatbot application 112 can determine whether a current chatbot session has ended. For the time that a chatbot session has not ended, chatbot application 112 can iteratively perform the loop of blocks 1122 to 1129. At a next iteration of send block 1122 chatbot application 112 can send prompting data to the user in accordance with the action decision at block 1125. At the conclusion of a chatbot session, chatbot application 112 at return block 1130 can return to a state prior to 1121 and can wait for a chatbot session to be invoked again.

At block 1128, prior to block 1129 chatbot application 112 can determine whether webpage serving and webpage browsing have been invoked, e.g., by the user clicking on the new pages while engaging in a chatbot session. On determining that webpage browsing has been invoked, chatbot application 112 at block 1128 can send chatbot session data for receipt by webpage serving application 111. The chatbot session data can specify the current state, e.g., the node order in chatbot tree data structure B1 associated to the conversation stage current chatbot session, as specified in the most recent chatbot session logging data logged at block 1127. Based on the received chatbot session data expressing the current conversation stage and node order the current chatbot session, webpage serving application 111 at action decision block 1119 can determine a webpage for presentment to the user.

In some embodiments, webpage serving application 111 at action decision block 1119 can determine to jump webpages from a current webpage to the webpage in the hierarchical order of webpages expressed in FIG. 2A having the order associated to the current stage of the chat browsing session specified by the chatbot session data sent at block 1128. For example, if according to the current chatbot session, chatbot response prompting data defined by the text based content B204T associated to conversation stage node B204 was last presented to the user during a current chatbot session, webpage serving application 111 at action decision block 1119 can determine to present to the user the webpage landing page associated to text B204T of conversation stage node B204 and associated to text A204T of linked node A204 of the webpage action state tree data structure A10 of FIG. 2A.

Thus, in response to completion of action decision block 1119, webpage serving application 111 can proceed to send block 1120. At send block 1120, webpage serving application 111 can send the selected webpage data defining a webpage to UE device 120Z in accordance with the action decision of block 1119. At return block 1122, webpage serving application 111 can return to a stage proceeding examine block 1111. In the described scenario, webpage serving application 111 can jump to webpage associated to current stage of a current chatbot session.

In another aspect the mapping data described with reference to FIG. 2A, 2B and/or table A can be used for enhancement of webpage DA process 114. For example, at block 1142 (FIG. 3) in identifying any missing landing pages for generation, webpage DA process can examine cross platform chat session historical data from chat session logging area 2224 for data indicating that a user has expressed a desire for a new intent. For example, in reply to certain stage prompting data, the user may enter a user reply string that is unrecognized as belonging to any candidate intent associated to the certain prompting data. At block 1142, using webpage serving to chatbot application mapping data, enterprise system 110 can identify for generation within update data generated at block 1444 update data for providing a new landing page associated to an extracted topic of the user reply string, and update data for providing a webpage link activation button on a webpage associated by the mapping data of FIGS. 2A, 2B and/or Table A to the certain conversation stage for access to the new landing page.

Embodiments herein recognize that an enterprise's website can be built out to answer user's questions and if information is not found they would either turn to a call center or a live person chat. Embodiments herein recognize that chatbots can be built as the intermediary communication channel to help with frequently asked questions or a replacement to a search engine that is more personable.

Embodiments herein can first initialize actions and states of a set of webpages hosted on a website and a chatbot dialog to determine respective dialog flows of the first and second user interfacing applications expressed as tree data structures that specify a data organization hierarchy. Embodiments herein can traverse each tree data structure to compare differences and present gaps and missing actions and responses. Embodiments herein can use natural language processing and machine learning models to evaluate passages and responses to the relevant questions or search statements. Embodiments herein can be used to evaluate both a webpage serving application and a chatbot application.

At (0.) there can be performed Initialize Mappings: Website and Chatbot dialog action states. At (0.1.) there can be performed website webpage tree map creation with actions and states. At (0.1.1.) there can be performed: Create an action state map of all possible actions and states a user can take and be in from an enterprise's website webpages or target page. Actions can include action to, e.g., click on, activate buttons, links, input text box, radio buttons, submit buttons, etc. States can include landing page, section, popup messages, etc. At (0.2.) there can be performed dialog path mapping. At (0.2.1.) there can be performed create dialog path with conditions, actions, and responses, e.g., intents, entities, conditions, options, responses. At (1.) there can be performed semi-static analysis: Check for gaps in chatbot dialog using website action states. At (1.1.) there can be performed turn each root state nodes to What, Who, How, When statements. At (1.2.) there can be performed traverse chatbot dialog path. At (1.3.) there can be performed log missing actions, labels, or responses to corresponding website webpage components if an option label presented in a website webpage is not a chatbot dialog option labels, log the difference using natural language processing and machine learning models (e.g., part-of-speech tagging, semantic analysis, decision tree models, K nearest neighbor) to return relevant website passages with confidence scores to missing responses in a chatbot dialog, e.g., if a landing page is the state and the chatbot dialog does not include answers using natural language processing to compare responses between chatbot and website webpage passages, i.e., or language present in landing page or relevancy score between the chatbot response and passages in landing page, using natural language processing to find relevant passages and confidence score on passages to present as possible responses. At (1.4.) there can be performed: Present analysis and suggestions to administrator developer user, e.g., present missing dialog option to administrator developer user along with details on where in the hierarchical order of the chatbot dialog the chatbot dialog should be changed, e.g., website webpage link(s), and missing option labels. At (2.) there can be performed live analysis: Website queries and click logs. At (2.1.) if the user enters a query in the search box of a website, the system logs actions and states; resulting in the path the user took to get to the answer. At (2.2.) the system analyzes the path and compares it with the chatbot dialog flow, states, and actions using natural language processing and machine learning models similar to (1.3.) and (2.3.) The system presents to an administrator developer user the analysis and suggestions similar to step (1.4.). At (3.) there can be performed live analysis: Combination of chatbot and website interactions. At (3.1.) the system can log combinations of chatbot interactions with website webpages, e.g., if the user enters a query, clicks on website webpage components, quits and instead use the chatbot, e.g., if the user enters query in chatbot, quits, then use the website instead. At (3.2.) there can be performed presenting new flows based on combination of chatbot interaction with website for evaluation.

Certain embodiments herein may offer technical computing advantages including computing advantages to address problems arising in the realm of computer systems. Embodiments herein can provide for rapid development of software including software for enhancement of user interfacing applications such as chatbot applications and/or webpage serving applications. According to one aspect, tree data structures for a webpage serving application and a chatbot application can be generated by examination of programming data and compared for identification of differences between the applications. Based on identified differences, update data can be generated to update one or more of the user interfacing applications. The update data can include, e.g., development prompting data to prompt a developer user to implement a change or can include program code data for installation into an existing one or more programs defining an existing user interfacing application. Features herein can provide for spontaneous spawning of chatbot application features based on identified attributes of a webpage serving application and can include spontaneous spawning of webpage serving application features based on identified attributes of a chatbot application. Embodiments herein can include features so that the state of a prior user interaction session is saved and used to intelligently provision the next user interaction session of the user, even where the user transitions platforms in the different user interaction sessions, e.g., transitions from webpage browsing to chat or vice versa. Embodiments herein can include utilization of mapping data that maps common attributes between user interaction user interfacing applications of different platforms, e.g., chat and webpage serving, to intelligently augment user experience when engaged in a user interaction session. Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 5:
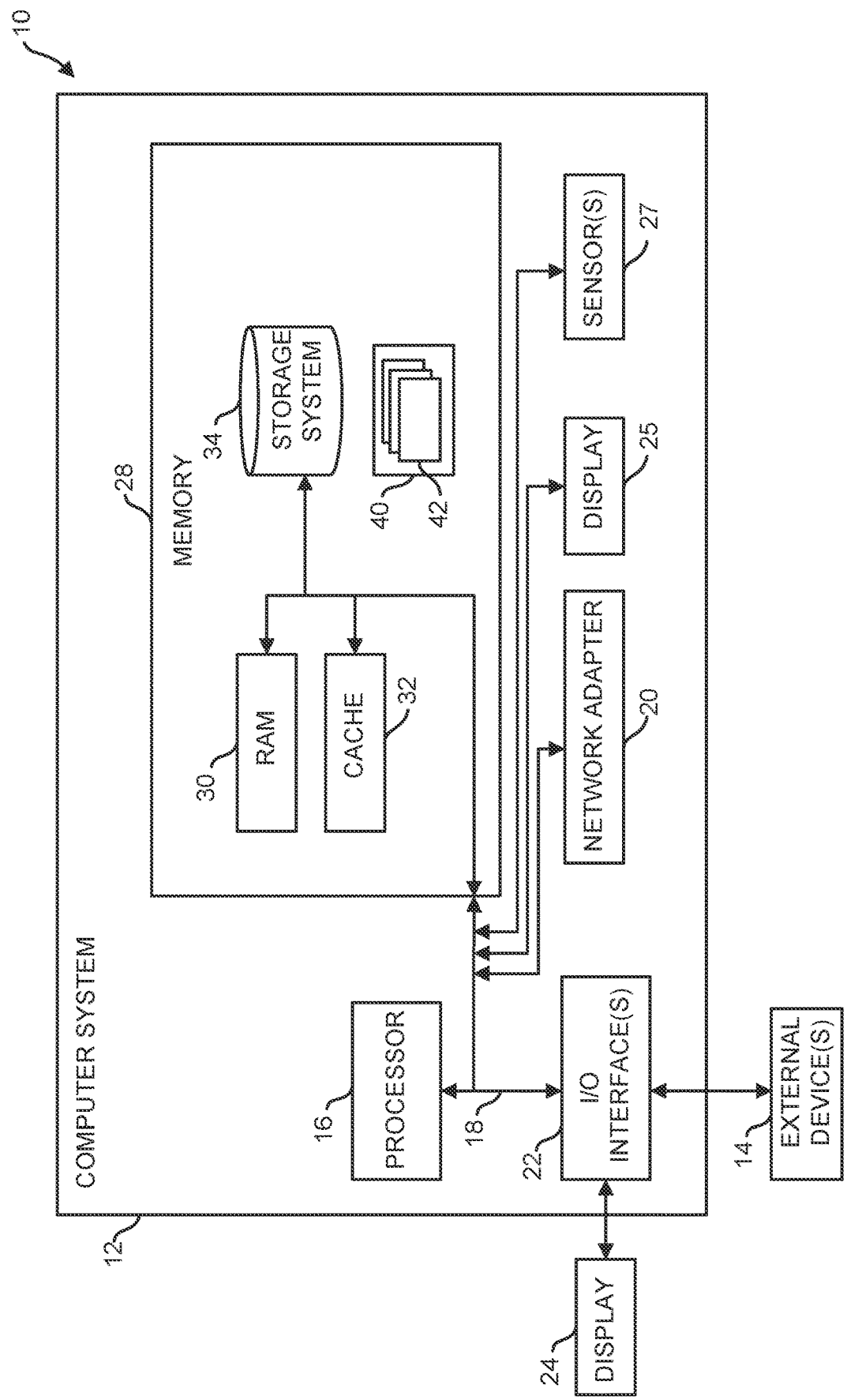
FIG. 5 depicts a computing node according to one embodiment.
Figure 6:
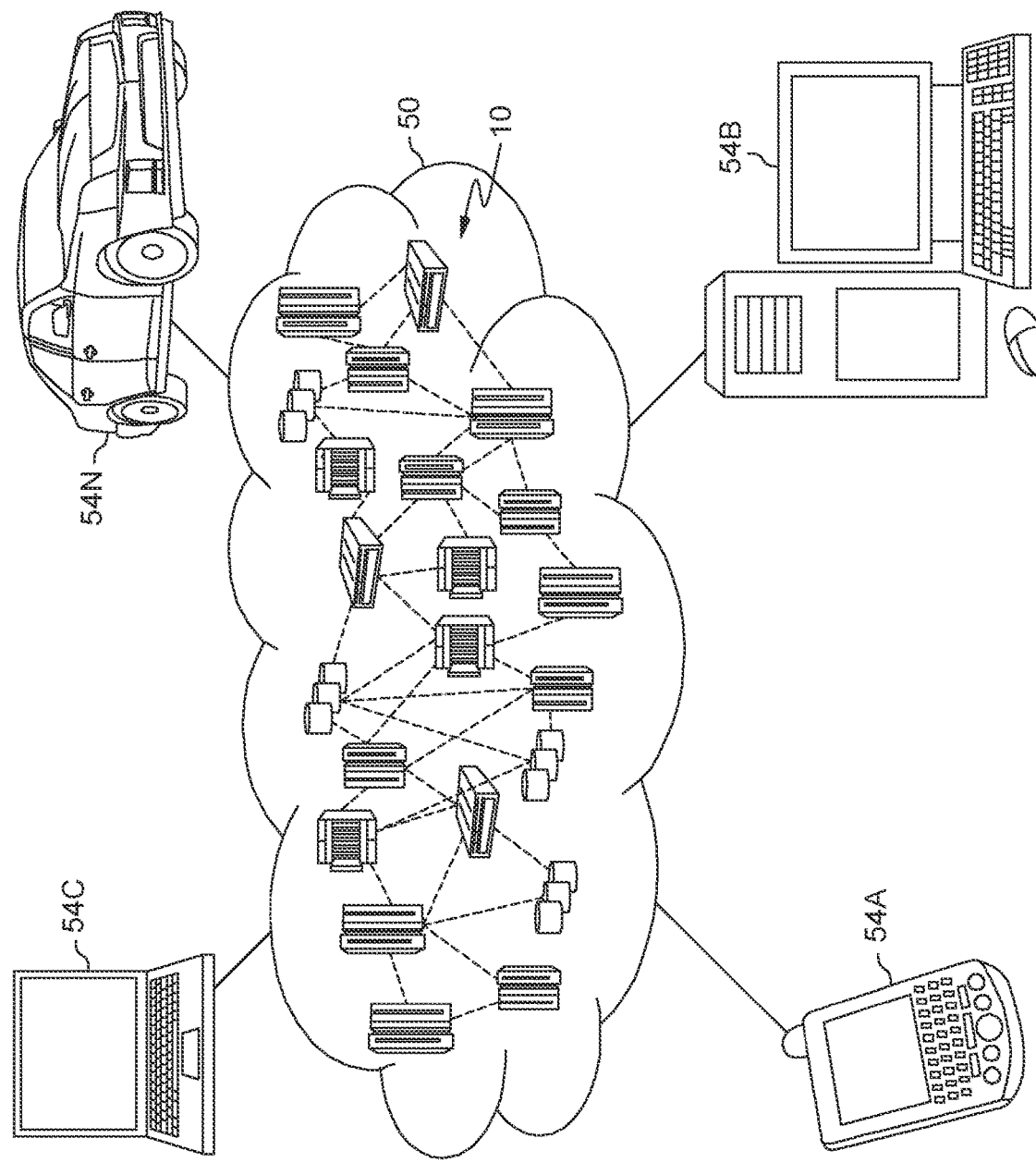
FIG. 6 depicts a cloud computing environment according to one embodiment.
Figure 7:
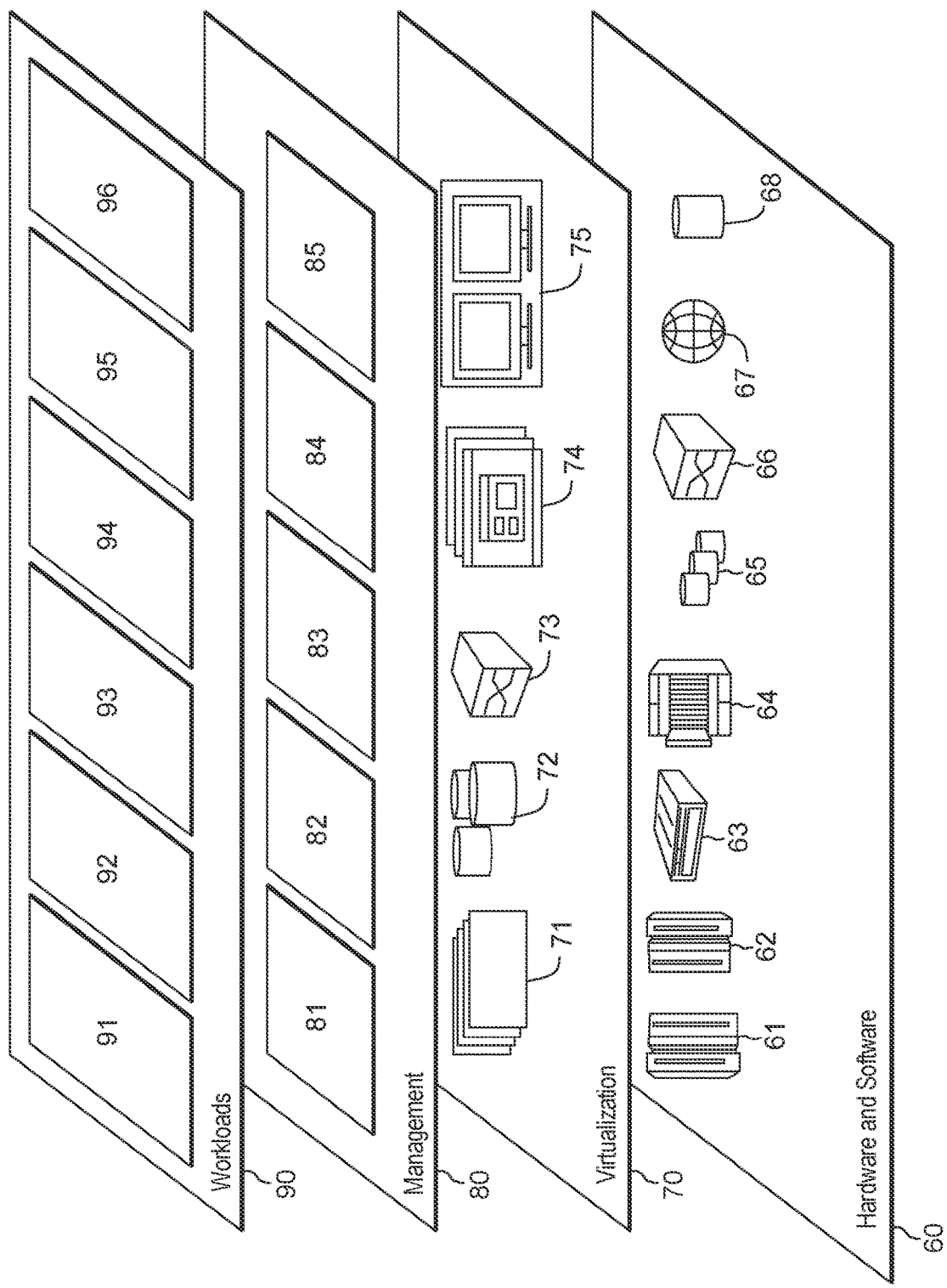
FIG. 7 depicts abstraction model layers according to one embodiment.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to functions described with reference to enterprise system 110 as set forth in the flowchart of FIGS. 3 and 4, including with the running of applications 111 and 112 defining processes, and processes 113-116. In one embodiment, one or more UE device 120A-120Z can include one or more computing node 10 and can include one or more program 40 for performing functions described with reference to one or more one or more UE device of UE devices 120A-120Z set forth in the flowchart of FIG. 3 and FIG. 4. In one embodiment, the computing node based systems and devices depicted in FIG. 1 can include one or more program 40 for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 6 computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for user interfacing enhancement as set forth herein. The processing components 96 can be implemented with use of one or more program 40 described in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining programming data defining a first user interactive user interfacing application for interactive engagement with an end user;
examining programming data defining a second user interactive user interfacing application for interactive engagement with a user;
identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and
generating update data for updating the second user interactive user interfacing application in dependence on the one or more difference between the second user interactive user interfacing application and the first user interactive user interfacing application.

2. The computer implemented method of claim 1, wherein the first user interactive user interfacing application is a chatbot application, wherein the second user interactive user interfacing application is a webpage serving application.

3. The computer implemented method of claim 1, wherein the update data includes development prompting data for prompting a developer user to revise the second user interactive user interfacing application.

4. The computer implemented method of claim 1, wherein the examining programming data defining the first user interactive user interfacing application includes examining programming data defining the first user interactive user interfacing application for generation of a first action state tree data structure characterizing the first user interfacing application.

5. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining the second user interactive user interfacing application includes examining programming data defining the second user interactive user interfacing application for generation of a second action state tree data structure characterizing the second user interfacing application.

6. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining the second user interactive user interfacing application includes examining programming data defining the second user interactive user interfacing application for generation of a second action state tree data structure characterizing the second user interfacing application, and wherein the identifying one or more difference between the second user interactive user interfacing application and the first user interactive user interfacing application includes comparing the second action state tree data structure to the first action state tree data structure.

7. The computer implemented method of claim 1, wherein the examining programming data defining the first user interactive user interfacing application, the examining programming data defining the second user interactive user interfacing application, the identifying and the generating update data are performed responsively to processing user defined text based data defined by the end user.

8. The computer implemented method of claim 1, wherein the examining programming data defining the first user interactive user interfacing application, the examining programming data defining the second user interactive user interfacing application, the identifying and the generating update data are performed responsively to processing user defined text based data defined by the end user, wherein the examining programming data defining the second user interactive user interfacing application results in a determination that the second user interactive user interfacing application is absent from a computing node based system hosting the first user interactive user interfacing application, and wherein the generating update data includes generating program code to instantiate the second user interactive user interfacing application on the computing node based system.

9. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining a second user interactive user interfacing application includes examining programming data defining the second user interactive user interfacing application for generation of a second action state tree data structure characterizing the second user interfacing application, wherein the second user interfacing application is provided by a chatbot application, wherein the first user interfacing application is provided by a webpage serving application, wherein the first action state tree diagram data structure and the second action state tree diagram data structure define mapping data by which a plurality of conversation stages of the chatbot application have respective associated landing pages of the webpage serving application.

10. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining a second user interactive user interfacing application includes examining programming data defining the second user interactive user interfacing application for generation of a second action state tree data structure characterizing the second user interfacing application, wherein the second user interfacing application is provided by a chatbot application, wherein the first user interfacing application is provided by a webpage serving application, wherein the first action state tree diagram data structure and the second action state tree diagram data structure define mapping data by which a plurality of conversation stages of the chatbot application have respective associated landing pages of the webpage serving application, wherein the identifying includes identifying with use of the mapping data that the chatbot application is missing a conversation stage associated to a certain landing page of the webpage serving application, and wherein the update data includes update data to add the missing conversation stage to the chatbot application, and wherein the update data includes transformed text based content that is based on text based content of the certain landing page.

11. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining a second user interactive user interfacing application includes examining programming data defining the second user interactive user interfacing application for generation of a second action state tree data structure characterizing the second user interfacing application, wherein the second user interfacing application is provided by a chatbot application, wherein the first user interfacing application is provided by a webpage serving application, wherein the first action state tree diagram data structure and the second action state tree diagram data structure define mapping data by which a plurality of conversation stages of the chatbot application have respective associated landing pages of the webpage serving application, wherein the identifying includes identifying with use of the mapping data that the chatbot application is missing a conversation stage associated to a certain landing page of the webpage serving application, and wherein the update data includes update data to add the missing conversation stage to the chatbot application.

12. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining a second user interactive user interfacing application includes examining programming data defining the second user interactive user interfacing application for generation of a second action state tree data structure characterizing the second user interfacing application, wherein the second user interfacing application is provided by a chatbot application, wherein the first user interfacing application is provided by a webpage serving application, wherein the first action state tree diagram data structure and the second action state tree diagram data structure define mapping data by which a plurality of conversation stages of the chatbot application have respective associated commonly labeled landing pages of the webpage serving application, wherein the identifying includes identifying with use of the mapping data that the chatbot application is missing a conversation stage associated to a certain landing page of the webpage serving application, and wherein the update data includes update data to add the missing conversation stage to the chatbot application within a hierarchical order of conversation stages of the chatbot application according to a hierarchical order of the certain landing page within a set of webpages servable by the webpage serving application.

13. The computer implemented method of claim 1, wherein the examining programming data defining the first user interactive user interfacing application includes examining programming data defining the first user interactive user interfacing application for generation of a first action state tree data structure characterizing the first user interfacing application, wherein the examining the programming data defining a second user interactive user interfacing application includes examining programming data defining the second user interactive user interfacing application for generation of a second action state tree data structure characterizing the second user interfacing application, wherein the second user interfacing application is provided by a chatbot application, wherein the first user interfacing application is provided by a webpage serving application, wherein the first action state tree diagram data structure and the second action state tree diagram data structure define mapping data by which a plurality of conversation stages of the chatbot application have respective associated landing pages of the webpage serving application, wherein the method includes running the chatbot application to initiate a chatbot session, analyzing historical session logging data of the webpage serving application in dependence on a current conversation stage of the chatbot session using the mapping data, and augmenting the chatbot session based on the analyzing historical session logging data of the webpage serving application.

14. The computer implemented method of claim 1, wherein the first user interfacing application is a webpage serving application, and wherein the second user interfacing application is a chatbot application, wherein the update data for updating the second user interactive user interfacing application includes update data to add a conversation stage to the chatbot application, wherein the update data specifies a hierarchical order location for the conversation stage in dependence on a hierarchical ordering within the webpage serving application of a webpage associated to the conversation stage.

15. The computer implemented method of claim 1, wherein the identifying one or more difference between the second user interactive user interfacing application and the first user interactive user interfacing application includes comparing a second action state tree data structure to a first action state tree data structure.

16. The computer implemented method of claim 1, wherein the identifying one or more difference between the second user interactive user interfacing application and the first user interactive user interfacing application includes comparing a second action state tree data structure associated to the second user interactive user interfacing application to a first action state tree data structure associated to the first user interactive user interfacing application.

17. The computer implemented method of claim 1, wherein the examining programming data defining the second user interactive user interfacing application results in a determination that the second user interactive user interfacing application is absent from a computing node based system hosting the first user interactive user interfacing application, and wherein the generating update data includes generating program code to instantiate the second user interactive user interfacing application on the computing node based system.

18. The computer implemented method of claim 1, wherein the generating update data includes generating program code to instantiate the second user interactive user interfacing application on a computing node based system.

19. The computer implemented method of claim 1, wherein the examining programming data defining the first user interactive user interfacing application, the examining programming data defining the second user interactive user interfacing application, the identifying, and the updating are iteratively performed so that a first update to the second user interactive user interfacing application is performed based on a first change to the first user interactive user interfacing application according to a first iteration of the updating, and wherein a second update to the second user interactive user interfacing application is performed based on a second change to the first user interactive user interfacing application according to second iteration of the updating.

20. A computer program product comprising:
a computer readable storage medium readable by one or more processing circuit and storing instructions for execution by one or more processor for performing a method comprising:
examining programming data defining a first user interactive user interfacing application for interactive engagement with an end user;
examining programming data defining a second user interactive user interfacing application for interactive engagement with a user;
identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and
generating update data for updating the second user interactive user interfacing application in dependence on the one or more difference between the second user interactive user interfacing application and the first user interactive user interfacing application.

21. A system comprising:
a memory;
at least one processor in communication with the memory; and
program instructions executable by one or more processor via the memory to perform a method comprising:
examining programming data defining a first user interactive user interfacing application for interactive engagement with an end user;
examining programming data defining a second user interactive user interfacing application for interactive engagement with a user;
identifying one or more difference between the second user interactive user interfacing application and the first user interactive user interfacing application using result data resulting from the examining programming data defining a first user interactive user interfacing application and resulting data resulting from the examining programming data defining a second user interactive user interfacing application; and
generating update data for updating the second user interactive user interfacing application in dependence on the one or more difference between the second user interactive user interfacing application and the first user interactive user interfacing application.

* * * * *